United States Patent
Potargent

(10) Patent No.: US 12,115,703 B2
(45) Date of Patent: Oct. 15, 2024

(54) SYSTEM AND METHOD FOR CONTROLLING A ROTATIONAL MOULDING PROCESS

(71) Applicant: AMS Belgium bvba, Bilzen (BE)

(72) Inventor: Johan Potargent, Bilzen (BE)

(73) Assignee: AMS Belgium bvba, Bilzen (BE)

(*) Notice: Subject to any disclaimer, the term of this patent is extended or adjusted under 35 U.S.C. 154(b) by 559 days.

(21) Appl. No.: 17/285,107

(22) PCT Filed: Nov. 22, 2019

(86) PCT No.: PCT/EP2019/082272
§ 371 (c)(1),
(2) Date: Apr. 14, 2021

(87) PCT Pub. No.: WO2020/104673
PCT Pub. Date: May 28, 2020

(65) Prior Publication Data
US 2021/0354341 A1 Nov. 18, 2021

(30) Foreign Application Priority Data
Nov. 22, 2018 (EP) .................. 18207875

(51) Int. Cl.
*B29C 41/52* (2006.01)
*B29C 41/46* (2006.01)
(Continued)

(52) U.S. Cl.
CPC ........... *B29C 41/52* (2013.01); *B29C 41/46* (2013.01); *G05B 17/02* (2013.01); *G06F 30/20* (2020.01); *B29C 41/04* (2013.01); *G06F 2113/22* (2020.01)

(58) Field of Classification Search
USPC .................................................. 700/202
See application file for complete search history.

(56) References Cited

U.S. PATENT DOCUMENTS

2007/0063370 A1* 3/2007 Steinberger ............. B29C 41/46
264/109
2010/0213638 A1* 8/2010 Maziers ................. B29C 41/003
264/310
(Continued)

FOREIGN PATENT DOCUMENTS

| EP | 2 832 519 A1 | 2/2015 |
| EP | 2844446 B1 | 9/2016 |

(Continued)

OTHER PUBLICATIONS

Crawford, "The DNA of Rotomolding" RotoWorld, Nov. 26, 2013, 4 pgs., (Year: 2013).*

(Continued)

*Primary Examiner* — Emilio J Saavedra
(74) *Attorney, Agent, or Firm* — N.V. Nederlandsch Octrooibureau

(57) ABSTRACT

Rotational moulding system configured for determining at least one suitable temperature-time program and at least one suitable motion-time program for the rotational moulding of an object by means of the rotational moulding system on the basis of a predetermined rotational moulding thermal characteristic of a raw material to be used for the rotational moulding of the object. Computer-implemented method for using the rotational moulding system.

13 Claims, 12 Drawing Sheets

(51) Int. Cl.
*G05B 17/02* (2006.01)
*G06F 30/20* (2020.01)
*B29C 41/04* (2006.01)
*G06F 113/22* (2020.01)

(56) References Cited

U.S. PATENT DOCUMENTS

| | | | | |
|---|---|---|---|---|
| 2010/0327474 A1* | 12/2010 | Hirdina | ............... | B29C 49/42 |
| | | | | 425/526 |
| 2014/0272256 A1* | 9/2014 | Langheld | ............... | B29C 41/04 |
| | | | | 264/114 |
| 2014/0358270 A1* | 12/2014 | Sudo | ............... | C30B 29/06 |
| | | | | 700/98 |
| 2016/0108187 A1* | 4/2016 | Wendeln | ............... | C08J 3/005 |
| | | | | 524/15 |
| 2017/0057148 A1* | 3/2017 | Altonen | ............... | B29C 45/16 |

FOREIGN PATENT DOCUMENTS

| | | | |
|---|---|---|---|
| KR | 20130007176 A | * | 1/2013 |
| WO | 9105647 A1 | | 5/1991 |

OTHER PUBLICATIONS

Bergamo et al., "Measurement and Control of Pressure Inside Rotational Moulds" accessed at: https://web.archive.org/web/20160412125551/https://rotoworldmag.com/measurement-and-control-of-pressure-inside-rotational-moulds/ captured Apr. 12, 2016, 12 pg. printout provided (Year: 2016).*

Roy Crawford: "The DNA of Rotomolding", RotoWorld, Nov. 26, 2013, pp. 1-4.

Spence et al.: "Rotational Molding Process Control" Society of Plastics Engineers. Annual Technical Conference (ANTEC). Proceedings, Society of Plastics Engineers, US, vol. 1, Jan. 1, 2003, pp. 1241-1245.

* cited by examiner

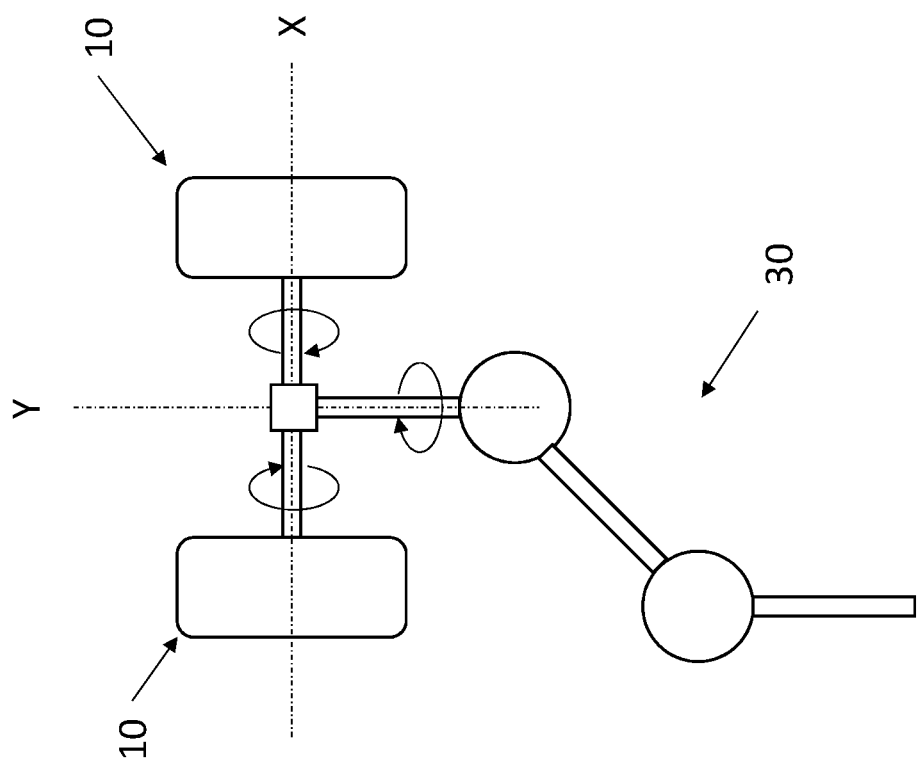
FIG. 1

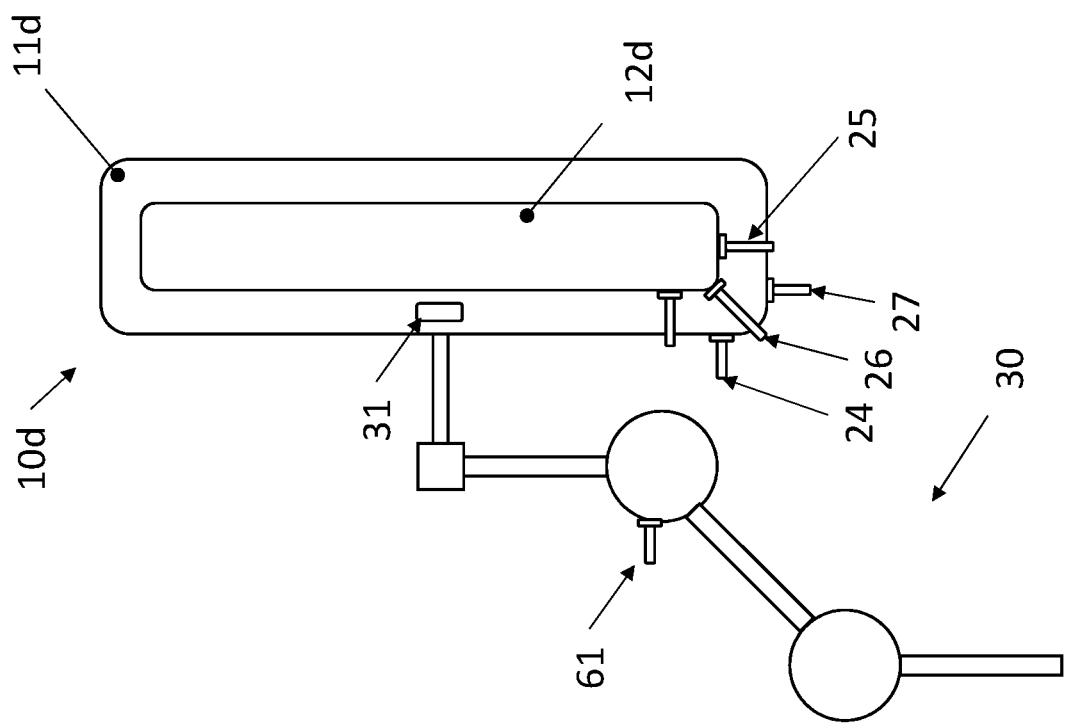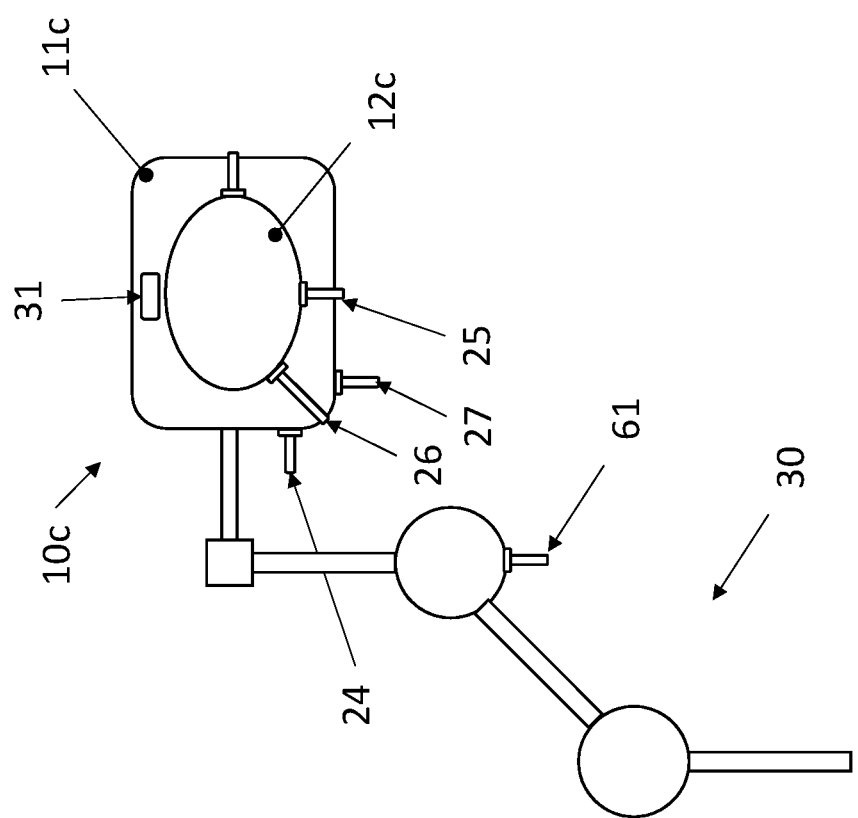

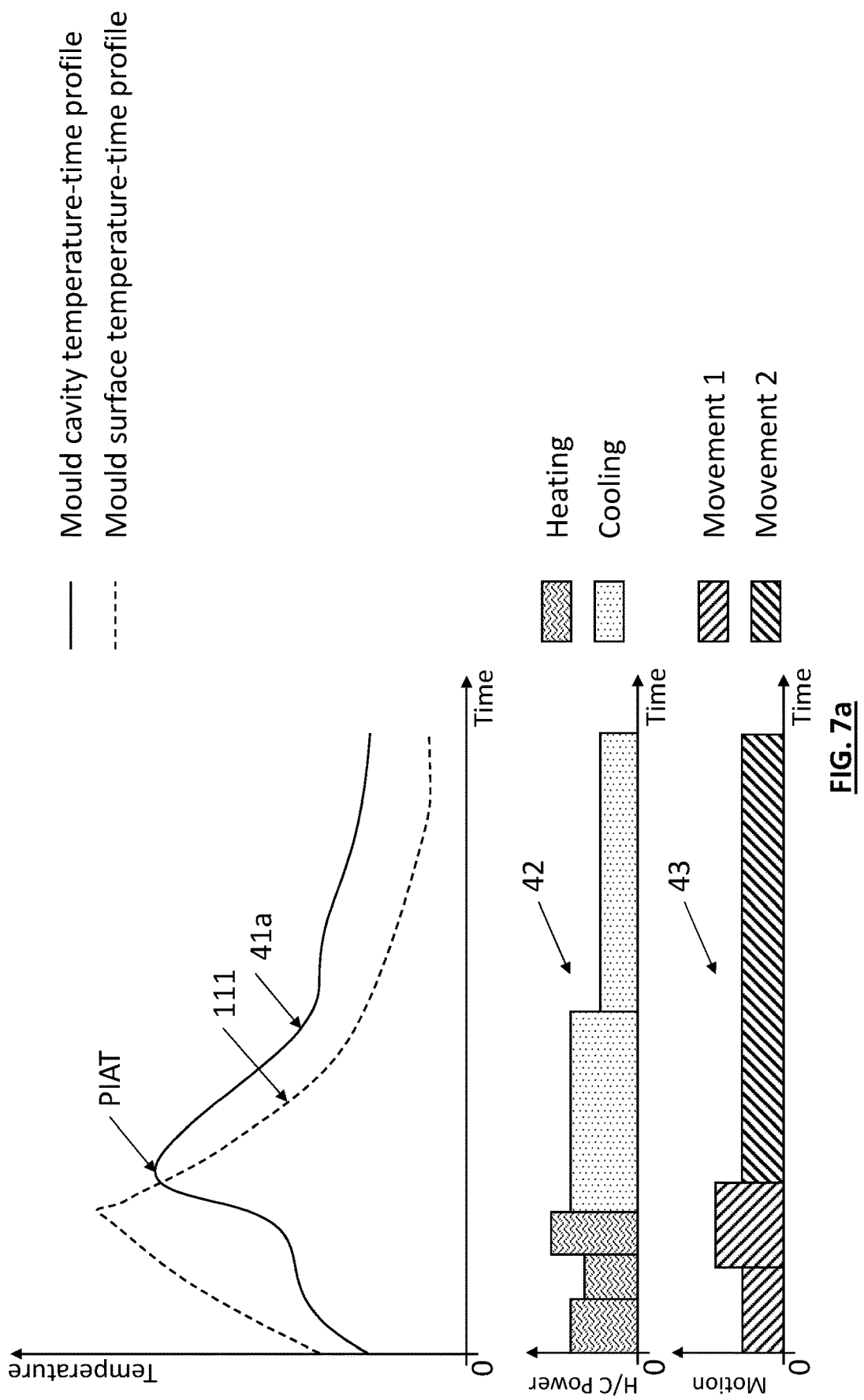

SYSTEM AND METHOD FOR CONTROLLING A ROTATIONAL MOULDING PROCESS

TECHNICAL FIELD

The present disclosure relates to a system and method for controlling a rotational moulding process. The present disclosure relates further relates to a system and method for the simulation of a rotational moulding process.

BACKGROUND ART

From EP 2832519 A1, a rotational mould for moulding hollow thermoplastic objects from basic thermoplastic material in the form of powder, granules or liquid is known. The mould comprises half-shells coupled to define a cavity having the shape of the object to be moulded; an electrically conductive element arranged to define a winding and connectable to a high frequency variable electrical power source, so as to generate a magnetic field in the half-shells to heat them by electromagnetic induction, wherein the electrically conductive element internally defines a passage for a cooling fluid.

EP 2832519 A1 further discloses a simulator device which is provided to optimize mould design for the purpose of mould heating. The simulator device comprises a memory, a processor and an interface. The memory contains the data defining a thermal model of the mould, said data comprising a plurality of model parameters representing, for example, the constructional features of the mould which are invariably related to the shape of the part to be moulded, as well as, the characteristics of electrically powering the mould by electromagnetic induction. The device is configured to receive input data relating to a plurality of input parameters representing the geometry of the mould as a function of the part to be moulded. On receiving this data, the processor sets the values of a plurality of model parameters relating to the geometry of the mould. Of these, some are optimization parameters because they contribute to defining the model but, at the same time, are a direct object of optimization performed by the device. These optimization parameters regard in particular the geometry of the coil (the geometry is a function of mould shape but is subject to a margin of variability and design choice). The memory contains software which, when run by the processor, starts a simulation or, preferably, two or more simulations of the thermal behaviour of (that is, of the temperature distribution in) the mould. The device may be programmed to allow setting of a plurality of model parameters such as, for example, the frequency of the supply voltage or the temperature and flow rate of the coolant. The distribution of the temperature in the mould is useful to assess the efficiency of rotational mould heating by electromagnetic induction. The device may be programmed to run an iterative process comprising a plurality of temperature distribution simulations, followed by corresponding modifications to the model parameter configuration (optimization). At the end of the simulation process, the device preferably returns a suggested geometry of the coil, calculated as a function of the geometry of the specific mould (or of the plastic part to be moulded) in order to optimize mould heating and energy yield.

SUMMARY OF THE DISCLOSURE

It is an aim of the present disclosure to provide an improved system and method for controlling a rotational moulding process.

It is another aim of the present disclosure to provide an improved system and method for simulating a rotational moulding process.

These and other aims may be achieved by the systems and methods of the disclosure as described herein below, aspects and/or embodiments of which may occur in combination with each other.

An aspect of the present disclosure provides a rotational moulding system, comprising a mould having a mould wall surrounding a mould cavity, a mould heating and cooling system at least partly integrated with the mould wall and provided for applying a temperature-time program to the mould, a motion system to which the mould is connectable and provided for applying a motion-time program to the mould, and a control system for controlling the mould heating and cooling system and the motion system.

The system may be configured for determining at least one suitable temperature-time program and at least one suitable motion-time program for the rotational moulding of an object by means of the rotational moulding system on the basis of a predetermined rotational moulding thermal characteristic of a raw material to be used for the rotational moulding of the object. In particular, the system may by itself be capable of determining at least a heating and cooling program and a motion program on the basis of at least the predetermined rotational moulding thermal characteristic of the selected material, possibly in combination with other parameters and/or constraints. As a result, the configuration of the rotational moulding system or process, comprising the determination of suitable programs for controlling the heating and cooling and/or motion, may be simplified.

In embodiments according to the disclosure, the configuration of the rotational moulding system or process is based solely on the predetermined rotational moulding thermal characteristic of a raw material. In other embodiments, the configuration of the rotational moulding system or process is based on the predetermined rotational moulding thermal characteristic of a raw material in combination with one or more other parameters and/or constraints, such as for example a maximum temperature of the rotational moulding process, a maximum duration of the rotational moulding process, or other.

In embodiments according to the disclosure, the rotational moulding system may comprise at least one sensor for collecting feedback of at least one process parameter during the rotational moulding of the object.

In embodiments according to the disclosure, the control system may be configured for evaluating the collected feedback and adjusting at least one of the temperature-time program and the motion-time program that is being applied. This allows for real-time adjustment of the program(s) based on collected feedback of one or more rotational molding process parameters.

In embodiments according to the disclosure, the control system may be configured for evaluating the collected feedback and determining a further temperature-time program and/or a further motion-time program to be applied for the rotational moulding of subsequent pieces of said object. This allows for the improvement of the moulding process for subsequent pieces of an object, based on collected feedback of one or more rotational moulding process parameters.

In embodiments according to the disclosure, the control system may be configured for transmitting the collected feedback to a remote server. This may allow for efficient storing of the feedback, and, using a remote server with for example high computational power, may improve or speed up the evaluation of the collected feedback, possibly also by combination with evaluation of feedback of rotational moulding process parameters collected elsewhere. The remote server may communicate evaluation results back to the control system, which may use the evaluation results for real-time adjustment of the rotational moulding process or for improvement of the moulding process for subsequent pieces of an object. In this way, rotational moulding systems located in different parts of the world can be set up to benefit from each-other's collected feedback, which can be particularly useful when the systems are configured for moulding the same object, or similar objects, from the same raw material.

In embodiments according to the disclosure, the at least one sensor may comprise one or more of the following sensors: temperature and motion sensors. Other sensors may comprise sensors for pressure, humidity, acoustic, electric current, flow, etc. The variety of sensors may be of significant importance to provide improved control of at least the mould heating and cooling system and the motion system.

In embodiments according to the disclosure, the control system may comprise a raw materials database containing data sheets of a plurality of raw materials, each of said data sheets comprising for each raw material at least one rotational moulding thermal characteristic. The control system may connect to a server to obtain said data sheets and/or said at least one rotational moulding thermal characteristic. The information on the rotational moulding thermal characteristic of a raw material may allow a more efficient determination of at least a suitable temperature-time program and a suitable motion-time program. Furthermore, this may simplify the selection of a suitable material for a given object to be moulded.

In embodiments according to the disclosure, each rotational moulding thermal characteristic may be segmented and each segment may be approximated by a mathematical function. This may allow the reduction of storage space and/or increase computational efficiency for faster evaluation of a rotational moulding thermal characteristic and faster determination of at least one suitable temperature-time program and at least one suitable motion-time program. In embodiments, this may further allow for faster evaluation of collected feedback of rotational moulding parameters, collected by means of one or more sensors, for example sensors as mentioned elsewhere herein. In embodiments, at least one, preferably a plurality of the segments are approximated by a first order mathematical function. In embodiments, at least one of the segments may be approximated by a second order, third order, or higher order mathematical function. In a preferred embodiment, at least one temperature critical segment is defined where the thermal characteristic is approximated more closely than in other segments and the at least one temperature critical segment is approximated by a second order, third order or higher order mathematical function whereas the other segments are approximated by first order mathematical functions. An example of a temperature critical segment is the part of the thermal characteristic between the melting point and the PIAT.

In embodiments according to the disclosure, each segment of the thermal characteristic and/or the transitions between the segments may be determined based on at least one raw material thermal behavior, such as for example raw material thermal properties such as melting point, PIAT, etc. This may allow efficient determination of each segment, and may result in efficient determination of at least one suitable temperature-time program and at least one suitable motion-time program.

In embodiments according to the disclosure, each data sheet may contain flow characteristics of the respective raw material, wherein the control system uses the flow characteristics in determining the suitable time-motion program. In particular, the control system may base a decision of which time-motion program to select from a number of available choices for time-motion programs on data about the flow characteristics of the respective raw material. This may help to ensure that the correct motion-time program is applied, and/or to detect that another raw material would be more suitable for the rotational moulding of the object.

An aspect of the present disclosure provides a method for using the rotational moulding system as described by the embodiments herein before, comprising the steps of providing a raw material to the mould cavity of the mould, applying a temperature-time program to the mould by means of the mould heating and cooling system at least partly integrated with the mould wall, applying a motion-time program to the mould by means of the motion system.

In embodiments according to the disclosure, the method comprises the step of controlling, by means of the control system, at least the mould heating and cooling system and the motion system, which may comprise the step of determining at least one suitable temperature-time program and/or at least one suitable motion-time program for the rotational moulding of an object by means of the rotational moulding system on the basis of a predetermined rotational moulding thermal characteristic of a raw material, which is to be used for the rotational moulding of the object.

An aspect of the present disclosure provides a computer simulation system for simulating a rotational moulding process, comprising a virtual mould having a mould wall surrounding a mould cavity, a virtual mould heating and cooling system at least partly integrated with the mould wall and provided for applying a temperature-time program to the virtual mould, and a virtual motion system provided for applying a motion-time program to the virtual mould.

The computer simulation system may be configured for determining at least one simulation variable on the basis of (i) a predetermined rotational moulding thermal characteristic of a raw material to be used for the rotational moulding of an object and (ii) a simulation of the rotational moulding of the object from said raw material by means of the virtual rotational moulding system. This allows for virtual testing and thus may for example avoid expensive steps such as building a physical mould which turns out not to be suitable for the rotational moulding process, or allow to predict or reduce the number of moulded objects which would be rejected, or allow to test moulding an object by means of one or more different raw materials, etc.

In embodiments according to the disclosure, the at least one simulation variable to be determined may comprise a suitable temperature-time program, i.e. a temperature-time program which is suitable for moulding the object from the raw material by means of a rotational moulding process. This allows for virtual testing of multiple temperature-time programs in parallel, and, thus, may reduce the time needed for determining a suitable temperature-time program. Furthermore, this allows for virtual testing of multiple temperature-time programs and motion-time programs in parallel, and, thus, may reduce the time needed for determining a suitable combination of a temperature-time program and a motion-time program.

In embodiments according to the disclosure, the virtual mould and the integrated part of the virtual heating and cooling system, integrated with the mould wall, may be defined on the basis of the predetermined temperature-time program. This allows for an efficient definition of a mould and the integrated part of the heating and cooling system, integrated with the mould wall, and thus for example reduce the cost compared to e.g. constructing several physical moulds during a trial-and-error process to find a suitable mould and integrated part of the heating and cooling system.

In embodiments according to the disclosure, the predetermined temperature-time program may be used as a basis for determining a suitable number and location of heating and/or cooling channels to be integrated in or on the virtual mould. This allows for a more efficient definition of the mould and the integrated part of the heating and cooling system based on the predetermined temperature-time program to be applied by the heating and cooling system.

In embodiments according to the disclosure, the at least one simulation variable to be determined may comprise a suitable motion-time program, i.e. a temperature-time program which is suitable for moulding the object from the raw material by means of a rotational moulding process.

In embodiments according to the disclosure, the simulation may be repeated using the previously defined virtual mould and integrated part of the virtual heating and cooling system. By repeating the simulation, the system may determine a more suitable temperature-time program and/or a more suitable motion-time program, e.g. to fine-tune a previously determined temperature-time program and/or a previously determined time-motion program. This allows for a more efficient determination of a suitable temperature-time program and/or a suitable time-motion program.

In embodiments according to the disclosure, the simulation system may comprise a raw materials database containing data sheets of a plurality of raw materials, each of said data sheets comprising for each raw material at least one rotational moulding thermal characteristic. The simulation system may connect to a server to obtain said data sheets and/or said at least one rotational moulding thermal characteristic. The information on the rotational moulding thermal characteristic of a raw material may allow more efficient determination of at least a suitable temperature-time program and/or a suitable motion-time program. Furthermore, this may simplify the selection of a suitable material for a given object to be moulded.

In embodiments according to the disclosure, each rotational moulding thermal characteristic may be segmented and each segment may be approximated by a mathematical function. This may allow the reduction of storage space and/or increase computational efficiency for faster evaluation of a rotational moulding thermal characteristic and faster determination of at least one suitable temperature-time program and at least one suitable motion-time program by means of the simulation system. In embodiments, at least one, preferably a plurality of the segments are approximated by a first order mathematical function. In embodiments, at least one of the segments may be approximated by a second order, third order, or higher order mathematical function. In a preferred embodiment, at least one temperature critical segment is defined where the thermal characteristic is approximated more closely than in other segments and the at least one temperature critical segment is approximated by a second order, third order or higher order mathematical function whereas the other segments are approximated by first order mathematical functions. An example of a temperature critical segment is the part of the thermal characteristic between the melting point and the PIAT.

In embodiments according to the disclosure, each segment of the thermal characteristic and/or the transitions between the segments may be determined based on at least one raw material thermal behavior, such as for example raw material thermal properties such as melting point, PIAT, etc. This may allow efficient determination of each segment, and may result in efficient determination of at least one suitable temperature-time program/or and at least one suitable motion-time program.

In embodiments according to the disclosure, each data sheet may contain flow characteristics of the respective raw material, wherein the simulation system may use the flow characteristics in determining the suitable time-motion program for the simulation.

In an embodiment, the simulation system may comprise a user interface, configured for enabling a user to define an object to be moulded by means of a rotational moulding process. This allows for easier interaction between the user and the simulation system, and, thus, simplifies the rotational moulding process or setting up the simulation thereof.

In an embodiment, a selection of temperature-time programs and/or motion-time programs may be suggested by the simulation system. In particular, the simulation system may, starting from the rotational moulding characteristic, determine a few possibilities for the temperature-time program and/or the motion-time program, and present these possibilities to the user whom can thereupon select one or more for simulation, or further simulation. This may simplify or speed up the simulation process because, for example, an experienced user can avoid selection of a program, or combination of temperature-time and motion-time program, which he or she already knows is not suitable or not efficient based on know-how or previous experiences.

An aspect of the present disclosure provides a computer-implemented method for simulating a rotational moulding process using a computer simulation system as described herein above, comprising the steps of providing a virtual mould having a mould wall surrounding a mould cavity, providing a virtual mould heating and cooling system at least partly integrated with the virtual mould wall and therewith applying a temperature-time program to the virtual mould, and providing a virtual motion system and therewith applying a motion-time program to the virtual mould.

The method may further comprise determining at least one simulation variable on the basis of (i) a predetermined rotational moulding thermal characteristic of a raw material to be used for the rotational moulding of an object and (ii) a simulation of the rotational moulding of the object from the raw material by means of the virtual rotational moulding system.

BRIEF DESCRIPTION OF THE DRAWINGS

The present disclosure will be discussed in more detail below, with reference to the attached drawings.

FIG. 1 shows a schematic representation of a rotational moulding system.

FIG. 3 shows schematic representations of (3a) a top cross-sectional view and (3b) a side view of a mould and at least one sensor integrated in the rotational moulding system.

DESCRIPTION OF EMBODIMENTS

Figure 2B:
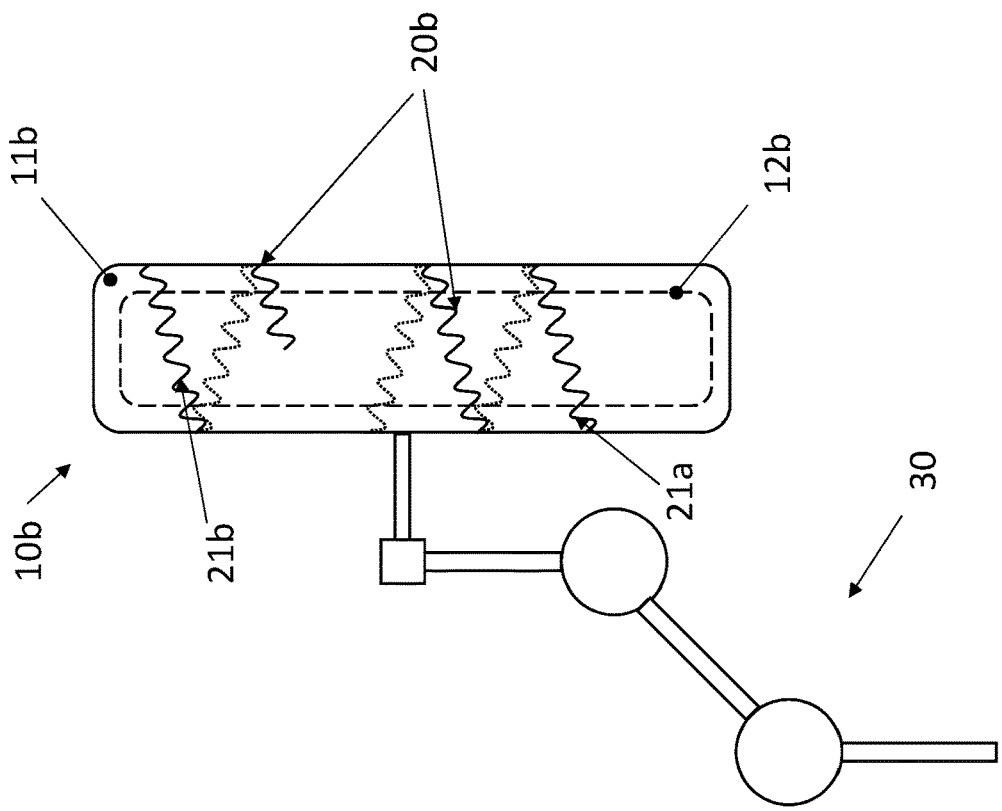
FIG. 2 shows schematic representations of (2a) a top cross-sectional view and (2b) a side view of a mould and a mould heating and cooling system.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

Furthermore, the various embodiments, although referred to as "preferred" are to be construed as exemplary manners in which the disclosure may be implemented rather than as limiting the scope of the disclosure.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present disclosure, the only enumerated components of the device are A and B, and further the claim should be interpreted as including equivalents of those components.

Due to the complex process and many variables involved in rotational moulding, it is currently not always possible to achieve economically viable large-scale production of rotation moulded products, i.e. to produce a large amount of the same item with the same quality.

The inventors have found that the profile of the rotational moulding thermal characteristic during rotational moulding of a specific object can be used as a 'fingerprint' unique to that object and it could be used as the basis for quality control. Many aspects of the resin, the additives, the powder quality and size, the manufacturing conditions etc., may affect the rotational moulding thermal characteristic and consequently the properties of a particular molded object. Different rotational moulding thermal characteristics may lead to differences in object properties such as wall thickness, variation of wall thickness, internal stress, impact toughness, brittleness, elasticity, density, hardness, compressive strength etc.

Manufacturers have previously investigated the relationship between rotational moulding thermal characteristics and object properties, and designed a rotational moulding system in view of achieving desired object properties, but there are currently no satisfactory ways to achieve strict compliance with at least one desired rotational moulding thermal characteristic and thus to achieve satisfactory reproducibility. Indeed, current rotational moulding systems follow a predetermined temperature-time program and motion-time program which are chosen based on the desired object, without taking variables into account which may affect how the mould or the resin in the mould will respond to the temperature-time program or motion-time program. Such variables may be resin related, such as density, degree of polymerization, copolymerization properties, melt flow index, viscosity, impurities, type and amount of additives, particle size, water content, residual solvent content, storage temperature and humidity, exposure to light etc., which often show a small variation between different batches of the same raw material, which can have a large impact on end-product quality and lead to rejected pieces. Such variables may also be process variables or equipment related, such as environmental parameters (temperature, humidity etc.), wearing down of equipment leading to irregularities in actual temperature achieved with respect to the amount of heating applied, actual motion overtime, etc. Additionally, the temperature-time profile is generally applied as predetermined heating (or cooling) periods at predetermined power levels, without taking into account the actual response of the mould or the raw material(s) in the mould.

Although systems and methods to track the mould cavity temperature and even allowing limited real-time adjustments during the moulding process, have been developed (e.g. the Rotolog® system), there remains a need for improved systems and methods for rotational moulding, especially for systems and methods which are specifically adapted for use with a mould mounted on a robot arm, such as a the rotational moulding systems known from EP 2844446 B1.

First embodiments of the rotational moulding system and method according to the disclosure will be described with reference to FIGS. 1-4. The rotational moulding system 1 comprises at least one mould 10, a mould heating and cooling system 20 provided for applying a temperature-time program to the mould(s) 10, a motion system 30 to which the mould(s) is/are connectable and provided for applying a motion-time program to the mould(s) 10, and a control system 40 for controlling the mould heating and cooling system 20 and the motion system 30.

Each mould 10 is used for the rotational moulding of a given object, and may designed with at least one mould property, comprising a property selected from the group consisting of: wall, cavity, material, shape, weight, volume, surface area, wall thickness, and design details (e.g. corner angles, corner radii, steps, recesses, kiss-offs, undercuts, ribbings, drafts, crowns). FIG. 2 schematically shows some embodiments of moulds 10*a*, 10*b*, each comprising a mould wall 11*a*, 11*b* surrounding a mould cavity 12*a*, 12*b*. The mould wall 11a, 11b may comprise or consist of any suitable material, such as aluminum or electroformed nickel, preferably aluminum.

Figure 2A:
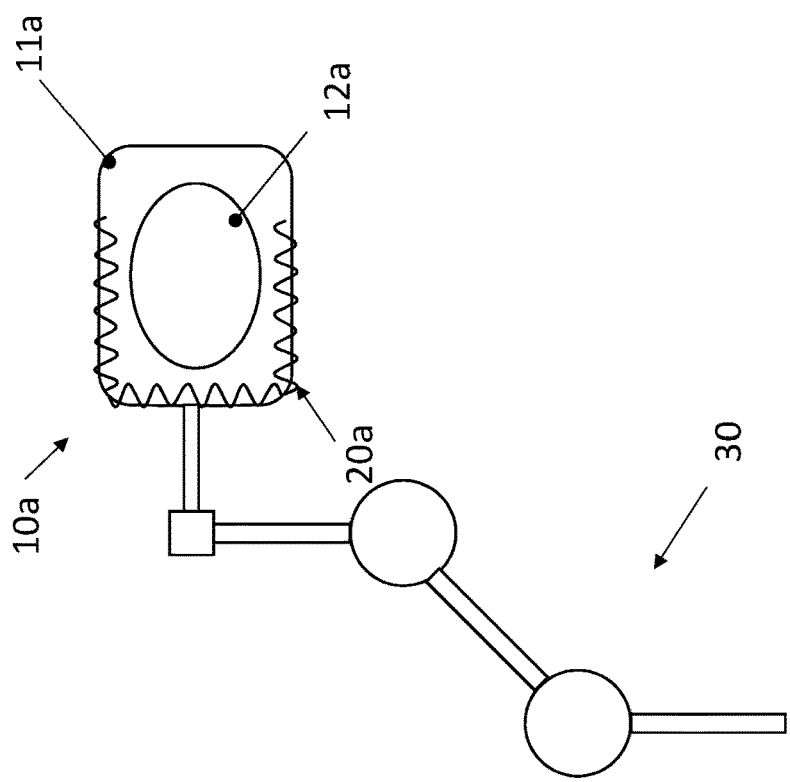
Figure 4:
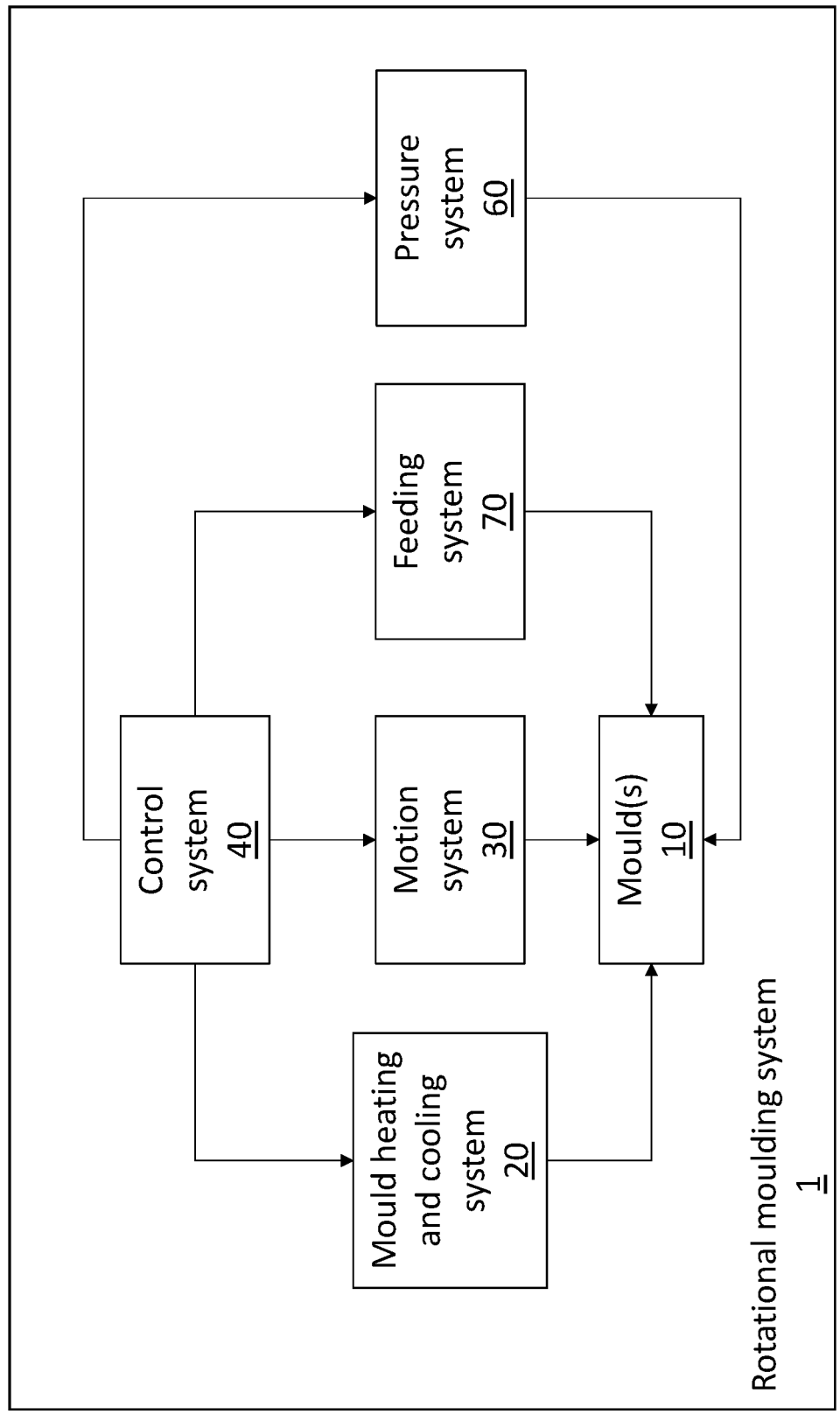
FIG. 4 shows a schematic diagram illustrating a rotational moulding system.

FIG. 2a shows a top cross-sectional view of an embodiment of a mould 10a and FIG. 2b shows a side view of an embodiment of a mould 10b, and wherein a mould heating and cooling system 20a, 20b may be at least partly integrated with the mould wall 11a, 11b and provided for applying a temperature-time program to the mould to control the temperature of the mould. Integrating the mould heating and cooling system 20a, 20b at least partly with the mould wall can be realized by different methods, for example by at least partially integrating the mould heating and cooling system 20a, 20b into the wall of the mould or by mounting the mould heating and cooling system 20a, 20b onto an outer side of the mould wall 11a, 11b or onto an inner side of the mould wall. The method of mounting shall be chosen by those skilled in the art taking into account the nature of the heating and cooling devices used.

In embodiments, the mould heating and cooling system 20a, 20b may comprise one or more heating devices for heating the mould wall 11a, 11b. The one or more heating devices may be mounted onto the mould wall 11a, 11b, for example by providing conduits for the passage of a liquid or gas onto the mould wall, or by providing infra-red or induction heating elements onto the mould wall. The one or more heating devices may also be integrated into the mould wall 11a, 11b, for example, by incorporating conduits for the passage of a fluid or gas in the wall, or electrical resistors or any other heating means into the mould wall.

In embodiments, the one or more heating devices may be positioned at a distance from the mould 10a, 10b, for example, infra-red cells that are positioned at a distance from the mould wall 11a, 11b. Preferably, the one or more heating devices may provide direct heating of the mould wall 11a, 11b, and are preferably arranged into or onto the mould wall 11a, 11b. Direct heating, may be carried out for example by the presence of electrical resistors on or incorporated into the mould wall, by induction heating or infrared heating in or on the mould wall, by the presence of channels on or in the mould wall for the passage of a liquid or a gas at the desired temperature, or by using microwaves for heating elements in or on the mould wall. The liquid may be supplied from a stock, for example a liquid bath in which the heating liquid is kept at the desired temperature. The heating liquid may comprise water, for example water which comprises an additive which improves the heat-exchange properties and/or a corrosion inhibitor. The heating liquid may comprise or consist of an oil, such as a mineral oil or a silicone oil. The heating liquid may be provided at one temperature or at multiple temperatures. Multiple heating liquids may be provided at multiple temperatures. Within the scope of the disclosure, a variety of heating liquids can be used. The different heating devices described earlier may be combined to provide more efficient heating.

In embodiments, the mould heating and cooling system 20a, 20b may comprise one or more cooling devices for cooling the mould wall 11a, 11b, wherein the one or more cooling devices are integrally formed with the mould wall. The one or more cooling devices may be mounted onto the mould wall, for example by providing conduits for the passage of a liquid or gas onto the mould wall. The one or more cooling devices may also be integrated into the mould wall, for example, by incorporating conduits for the passage of a fluid or gas in the wall. The liquid may be supplied from a stock, for example a liquid bath in which the cooling liquid is maintained at the desired temperature. The cooling liquid may comprise water, for example water which comprises an additive which improves the heat-exchange properties and/or a corrosion inhibitor. Other suitable cooling media comprise liquid nitrogen or liquid or gaseous $CO_2$. It may be decided to keep one cooling liquid at one temperature, but it may also be decided to keep one cooling liquid at multiple temperatures or to keep multiple cooling liquids at multiple temperatures. Within the scope of the disclosure, various cooling liquids may be used. The cooling device can also be positioned at a short distance from the mould while still being integrally formed with the mould, for example, fans that are attached to the mould, such as embedded in the mould wall, wherein part of the mould surface directly affected by the air stream generated by these fans is optionally shaped to have a higher surface area than other parts of the surface of the mould. The different cooling devices described earlier may be combined to provide more efficient cooling.

In embodiments, the mould heating and cooling system 20a, 20b may comprise one or more heating devices and one or more cooling devices. The one or more heating devices and the one or more cooling devices may be associated with same devices. For example, the same channels may allow the passage of liquid or gas, wherein the liquid or gas may be supplied at a desired temperature, such that high temperatures of the liquid or gas are provided for heating the mould or parts thereof and low temperatures of the liquid or gas are provided for cooling the mould or parts thereof. Other examples may include one or more fans that allow for blowing air at desired temperatures, wherein the air may be supplied at desired temperatures, a liquid bath or a spraying device wherein the liquid is controlled at desired temperatures, or an injection device provided for injecting a gas or liquid into the mould cavity at desired temperatures. Preferably at least the heating device is integrated with the mould wall 11a, 11b.

In embodiments, such as for example shown in FIG. 2b, the mould heating and cooling system 20b may be provided for applying temperature-time program to a particular part of the mould, without disturbing or adversely affecting the temperature-time programs of the other parts of the mould. In particular, by applying different temperature-time programs to different parts of the mould, each part of the mould can be heated or cooled independently of the other parts of the mould. Thus, temperature-time programs may thus be chosen for each part of the mould independently of the other parts. For example, a liquid is provided at one temperature in a first channel 21a, a liquid is provided at another temperature in a second channel 21b, etc. the channels being integrated in different parts of the mould.

FIG. 1 schematically shows an embodiment of a rotational moulding system 1 comprising multiple moulds 10. A mould heating and cooling system (not shown in this figure) may, independently of optionally other moulds, apply a temperature-time program specific to each mould without disturbing or adversely affecting the temperature-time program of the other moulds. In particular, each mould may be heated or cooled independently of the other moulds. Thus, temperature-time programs may thus be chosen for each mould independently of the other. Otherwise, also the same temperature-time program may be applied to a number of moulds 10 or all moulds 10.

A temperature-time program may refer to instructions for varying electrical power to a heating-cooling system during rotational moulding, or varying the supply of heating and/or cooling liquid to channels on the mould, or generally instructions for operating heating of the mould and cooling of the mould.

In embodiments according to the present disclosure, the integration of the mould heating and cooling system 20 at least partly with the mould wall 11 may improve the mobility and manipulability of the mould, since manipulation of the mould may take place together with the mould heating and cooling system, and the mould should not be removed thereof to provide access to the mould. Furthermore, the displacement of the mould is not hindered by a surrounding casing of a mould heating and cooling system, but the mould may be displaced, moved, and manipulated as a whole, and may be subjected to rotation, shaking or tilting movement.

In FIGS. 1-3, the motion system 30 to which a mould is connectable may comprise a plurality of electrical motors, hydraulic and/or pneumatic actuators, and may preferably be a robot arm 30 provided for applying a motion-time program to the mould 10. The motion system may comprise one or more robot arms 30, controllable by the control system 40. The end of one or more robot arms 30 carries one or more moulds 10 for forming an object out of the raw material. Each mould 10 is movably arranged relative to the robot arm 30, the control system 40 or a combination thereof. Preferably, the movement of the mould(s) 10 relative to the robot arm(s) 30 of the device for rotational moulding is/are controlled by the robot arm 30, the control system 20 or a combination thereof.

In the embodiments shown, the moulds 10 may be rotationally mounted on the respective robot arm 30. Preferably, each mould 10 may be rotationally positioned about a first axis X to allow the production of hollow objects. An improved uniformity of the wall thickness of the object can be obtained by rotationally positioning the mould about a first axis X and a second axis Y. The first axis X and the second axis Y can be a horizontal and a vertical axis, but may also be oriented in any angle with respect to horizontal, resp. vertical. Rotation about a first axis X and a second axis Y can also be chosen to locally vary the wall thickness of the hollow object. Herein, the second axis Y is preferably positioned at a second angle relative to the first axis X, for example at an angle of 90 degrees, however, any other angle can suitably be used if the application requires so. Preferably, the angle between the first axis X and the second axis Y is adjustable. Preferably, the speed with which the mould may rotate about the first axis X and the second axis Y is individually adjustable. Preferably, the rotation speed about the first axis X is adjustable independently from the rotation speed about the second axis Y and vice versa. In alternative embodiments, instead of or additionally to rotationally positioning the mould about a first axis and a second axis, it may be desired to rotationally position the mould around a first axis X and tiltable relative to a third axis Z. The speed or tilt frequency with which the mould 10 is tilted relative to the third axis Z, is preferably individually adjustable for every mould, as well as the angle at which the mould is tiltable and any other parameter that influences the tilt movement. Controlling the tilt movement of the mould 10 can take place directly using the robot arm 30, or indirectly using the control system 40 that transmits a corresponding signal to the robot arm 30, that subsequently controls the movement of the mould.

In embodiments, the motion system 30 may be provided for moving the mould 10 between one or more of the following positions: a position for filling the mould with raw material, a position for subjecting the mould to one or more temperature regimes, a position for subjecting the mould to one or more movements, and a position for demoulding the object formed in the mould. Preferably, the position for subjecting the mould to one or more temperature regimes, and the position for subjecting the mould to one or more movements are the same, so that the mould can be moved (e.g. rotated) and subjected to a temperature regime (e.g. cooling by external fans) simultaneously. For example, the heating position and the rotation position may coincide. In another example, the cooling position may coincide with the previously mentioned positions. Moving the mould 10 between these positions is preferably implemented by moving a robot arm 30 in such a way that the mould 10 performs the desired movement. This implies that the robot arm 30 itself may also be movably arranged, for example movable on a platform in at least one direction. The movement of the robot arm 30 may be controlled by a control system 40 that is present in the robot arm 30. The movement of the robot arm may also be controlled by the control system 40 that is provided to communicate with the robot arm 30 for controlling the movement. A combination of both is also possible.

In embodiments, the mould 10 and a raw material feeding system 70 may be movably arranged relative to one another, preferably, the mould 10 is movable from and to the plastic feeding system 70 by means of the robot arm 30 to which the mould is connectable. In case the rotational moulding system contains multiple material feeding systems, the robot arm is preferably provided to control the displacement of the mould 10 to the desired feeding system 70.

In embodiments, the motion system may be provided for moving a plurality of moulds connected to the motion system. The plurality of moulds may be connectable to one robot arm. Two or more moulds may be connectable to one or more robot arms. Each mould may be associated with its own robot arm.

Figure 5:
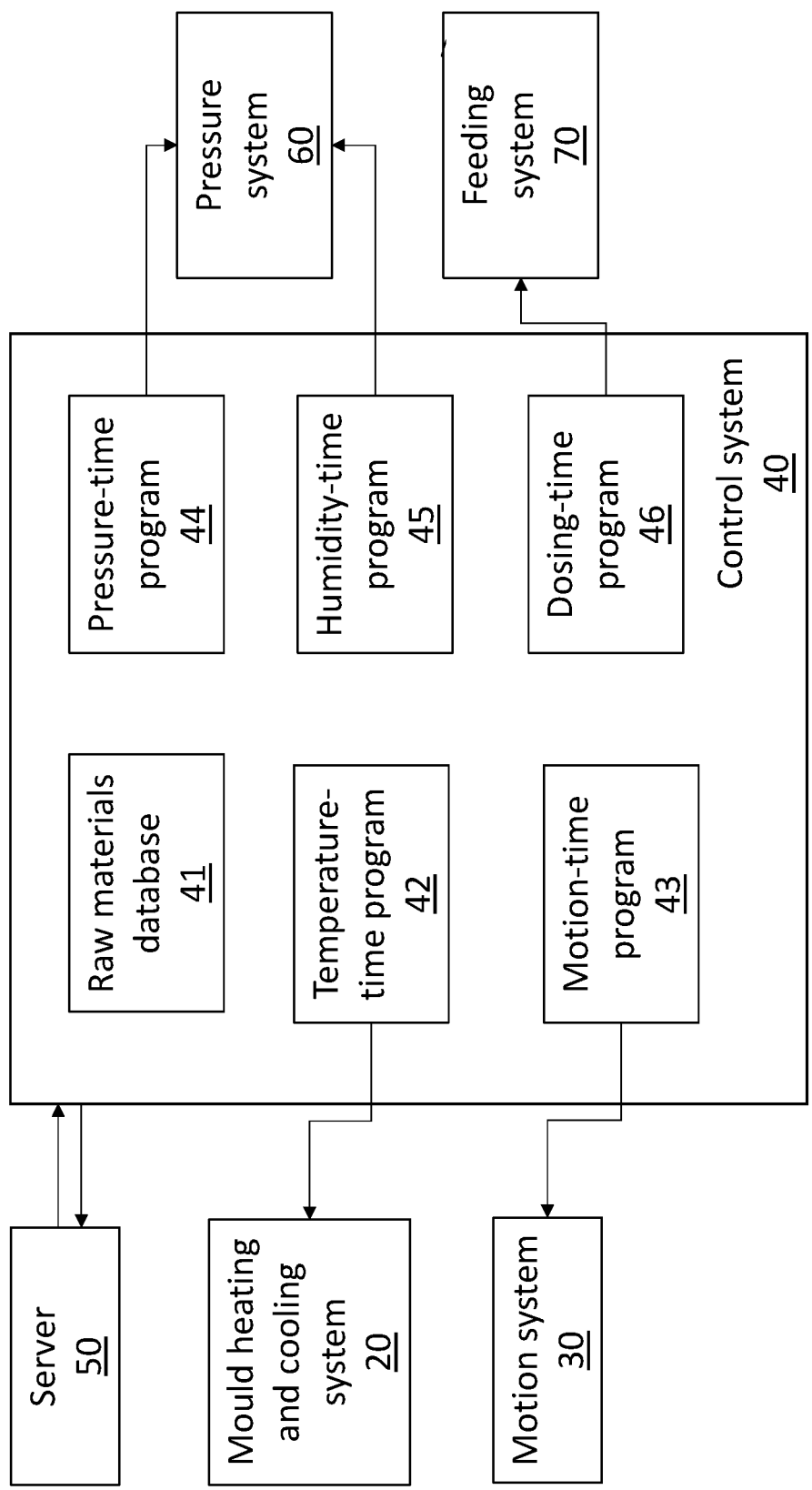
FIG. 5 shows a schematic diagram illustrating a control system.

FIG. 5 schematically shows a detailed part of a control system 40 for controlling the mould heating and cooling system 20 by determining at least one suitable temperature-time program 42. A suitable temperature-time program 42 may be a program selected by a user from a list of a plurality of temperature-time programs, which is preferably a list containing a limited set of options which the control system 40 may determine based on the rotational moulding thermal characteristic(s) of one or more raw materials. The control system 40 may be configured for controlling heating comprising controlling the amount of heat supplied to the mould 10 by means of direct heating or other heating means as described herein earlier, such as by controlling the amount of power provided to an electrical heating device, or by controlling the temperature and/or flow rate of a heating gas or liquid, preferably by controlling the amount of power provided to an electrical heating device. In embodiments, the mould 10 may be provided with multiple integrated heating devices, heating the mould in zones and separately controllable by the control system. The control system 40 may be provided for controlling cooling comprising controlling the amount of heat subtracted from the mould 10 by means of a cooling device, which may be formed integrally with the mould wall 11 or may be an indirect cooling device as explained herein earlier, e.g. by controlling the amount of air flow generated by a ventilator.

In the embodiment shown, the control system 40 for controlling the motion system may be configured for determining at least one suitable motion-time program 43. A suitable motion-time program 43 may be a program selected by a user from a list of a plurality of motion-time programs, which is preferably a list containing a limited set of options which the control system 40 may determine based on the rotational moulding thermal characteristic(s) of one or more raw materials. The control system 40 may be configured for controlling motion, which may comprise controlling the mould orientation, i.e. direction of its major axis, the speed of mould rotation and/or the ratio of mould rotation, wherein the ratio of the mould may be provided by the ratio of speeds around the two orthogonal axes, sequence of movements, etc. all together may be programmed in the motion-time program 30.

In the embodiment shown, the control system 40 for controlling the mould heating and cooling system 20 and the motion system 30 may be configured for determining at least one suitable temperature-time program 42 and at least one suitable motion-time program 43. The at least one of a suitable temperature-time program 42 and a suitable motion-time program 43 may be a program selected by a user from a list of a plurality of temperature-time programs and motion-time programs, which is preferably a list containing a limited set of options which the control system 40 may determine based on the rotational moulding thermal characteristic(s) of one or more raw materials. The selection of temperature-time programs and motion-time programs may be independent from each other and/or combined, which means that the control system may suggest one or more combinations of a temperature-time program with a motion-time program.

In the embodiment shown, the control system 40 may further be provided for controlling a pressure system 60 and may be configured for determining at least one suitable pressure-time program 44. A suitable pressure-time program 44 may be a program selected by an user from a list of a plurality of pressure-time programs. The control system 40 may be configured for controlling pressure, such as by controlling one or more pressure regulating means, such as valves, which are provided for regulating the pressure inside the mould cavity 12 and are at least capable of changing between a closed and an open position, wherein the closed position substantially closes the mould cavity and the open position substantially allows gas exchange with ambient air or a pressure controlled environment, such as pressurized air.

In the embodiment shown, the control system 40 provided for controlling a pressure system 60 may be further configured for determining at least one suitable humidity-time program 45. A suitable humidity-time program 45 may be a program selected by an user from a list of a plurality of humidity-time programs. The control system 40 may be configured for controlling humidity, such as by controlling one or more humidity regulating means, such as valves, which are provided for regulating the humidity inside the mould cavity 12 and are at least capable of changing between a closed and an open position, wherein the closed position substantially closes the mould cavity and the open position substantially allows gas/and or liquid exchange with ambient air or a humidity controlled environment, such as a humidifier. In embodiments the open position substantially allows liquid water or water vapour to be injected into the mould.

In the embodiment shown, the control system 40 may be further provided for controlling a feeding system 70 and may be configured for determining at least one suitable dosing-time program 46. A suitable dosing-time program 46 may be a program selected by an user from a list of a plurality of dosing-time programs. The control system 40 may be configured for controlling raw material dosing comprising controlling the type of raw material dosed, the rate of raw material dosing and/or the amount of raw material dosed. In embodiments, the control system 40 may be configured to control the application of a demoulding agent or processing aid to at least a part of the surface of the mould cavity. Suitable demoulding agents and processing aids are commercially available and known in the art. The control system may control the application of a demoulding agent to at least a part of the surface of the mould cavity, such as to more than 40%, more than 70%, more than 90% or all of the surface of the mould cavity.

In embodiments according to the disclosure, the control system 40 may comprise one unit or multiple units communicating with each other. For example, a main unit and one or more sub-units, for instance, separately controlling heating devices, cooling devices, robot arms, etc.

In embodiments according to the disclosure, the control system 40 may be configured to control at least one of the mould heating and cooling system 20, the motion system 30, the pressure system 60 and the feeding system 70, preferably at least the mould heating and cooling system 20 and the motion system 30.

As used herein, a rotational moulding system 1 may perform a set of instructions provided by the control system 40 to the mould heating and cooling system 20 and/or the motion system 30 which results in the desired manipulations to produce a rotationally moulded object from a raw material as defined herein before. The control system may comprise human intervention (e.g. for raw material dosing), but is preferably completely automated.

As used herein, a temperature-time program 42 refers to a set of instructions which may be provided by the control system 40 to the mould heating and cooling system 20 and which results in predetermined intensities and time periods of heating and/or cooling being applied to the mould by means of the one or more integrally formed temperature control devices and/or by means of the optional indirect heating/cooling devices. It will be understood by the skilled person that a temperature-time program 42 may comprise periods wherein no heating or cooling is applied to the mould which may, depending on factors such as the surrounding temperature or ongoing physical or chemical processes, result in the mould temperature remaining relatively stable, decreasing or increasing. The temperature-time program 42 is at least partially, preferably completely, applied to the mould by means of the mould heating and cooling system 20 controlled by the control system 40.

As used herein, a motion-time program 43 refers to a set of instructions which may be provided by the control system 40 to the motion system 30 and which results in predetermined intensities, time periods and types of movements being applied to the mould. It will be understood by the skilled person that a motion-time program 43 may comprise periods wherein no movement is applied to the mould. The motion-time program 43 is applied to the mould by means of the motion system 30 controlled by the control system 40.

As used herein, a pressure-time program 44 refers to a set of instructions which may be provided by the control system 40 and which results in predetermined intensities and time periods of pressure being applied to the mould cavity 12 by means of the one or more pressure regulating means, such as valves, which are provided for regulating the pressure inside the mould cavity and are at least capable of changing between a closed and an open position, wherein the closed position substantially closes the mould cavity 12 and the open position substantially allows gas exchange with ambient air or a pressure controlled environment, such as pressurized air. It will be understood by the skilled person that a pressure-time program 44 may comprise periods wherein no change in pressure occurs in the mould which may, depending on factors such as the mould temperature, ongoing physical or chemical processes, or surrounding temperature or pressure, result in the mould cavity pressure remaining relatively stable, decreasing or increasing. The pressure-time program 44 is at least partially, preferably completely, applied to the mould cavity 12 by means of the pressure system 60 controlled by the control system 40.

As used herein, a humidity-time program 45 refers to a set of instructions which may be provided by the control system 40 and which results in predetermined intensities and time periods of humidity being applied to the mould cavity 12 by means of the one or more humidity regulating means, such as valves, which are provided for regulating the humidity inside the mould cavity 12 and are at least capable of changing between a closed and an open position, wherein the closed position substantially closes the mould cavity 12 and the open position substantially allows gas/and or liquid exchange with ambient air or a humidity controlled environment, such as a humidifier or a dehumidifier. It will be understood by the skilled person that a humidity-time program 45 may comprise periods wherein no change in humidity occurs in the mould which may, depending on factors such as the mould temperature, ongoing physical or chemical processes, or surrounding temperature or humidity, result in the mould cavity pressure remaining relatively stable, decreasing or increasing. The humidity-time program 45 is at least partially, preferably completely, applied to the mould cavity 12 by means of the pressure system 60 controlled by the control system 40.

As used herein, a dosing-time program 46 refers to a set of instructions which may be provided by the control system 40 to the feeding system 70 and which results in the feeding of predetermined amounts of raw material at a predetermined rate at predetermined time points. Feeding may be achieved manually or in an automated fashion, by using one or more raw material feeding devices controlled by the control unit, as described herein.

In an embodiment, the dosing-time program 46 may be applied to the mould manually, such as by manual feeding of raw material into the mould cavity, preferably the dosing-time program is applied to the mould cavity by means of a raw material feeding system controlled by the control system.

Referring to FIG. 3, sensors will be described which may also be used in the other embodiments of rotational moulding systems described herein. FIG. 3a schematically shows a top cross-sectional view of an embodiment of a mould 10c and FIG. 3b schematically shows a side cross-sectional view of an embodiment of a mould 10d. The rotational moulding system 1 may comprise at least one sensor 24, 25 for collecting feedback of at least one process parameter during the rotational moulding of the object. The at least one sensor 24, 25 may comprise a mould wall sensor 24 and/or a mould cavity sensor 25 comprising one or more sensors selected from the group of: temperature, motion, pressure, humidity, acoustic, electric current, flow, etc.

In embodiments shown, a temperature sensor 24, 25 may be provided for measuring a temperature parameter, such as the temperature of the mould cavity 12c, 12d, mould outer surface, mould inner surface, mould wall core 11c, 11d, heating device, cooling device, motion system, feeding system, etc. Suitable temperature sensing means are known to the skilled person and not particularly limited. Preferred temperature sensing means may comprise a thermocouple temperature sensor.

In embodiments shown, a motion sensor 31 may be provided for measuring a motion parameter of the mould or motion system, such as position, angle, displacement, distance, acceleration, speed, direction of motion, etc. Suitable motion sensing means may comprise accelerometers, gyroscopes, magnetometer, GPS or a combination thereof.

In embodiments shown, a pressure sensor 25, 61 may be provided for measuring a pressure parameter, such as the pressure in the mould cavity 12, wherein a pressure sensor 25 is integrated in or on a motion system 30 whereon a pressure sensor 61 is mounted, for example for measuring the amount of force exerted by a motor on the robot arm. Suitable pressure sensing means are known to the skilled person and not particularly limited. Preferred pressure sensing means may comprise a strain gauge.

In embodiments shown, a humidity sensor 26, 27 may be provided for measuring a humidity parameter, such as the humidity of the mould cavity 12c, 12d, the feeding system 70, or outer environment of the mould (e.g. room humidity, mould outer surface, etc.). Suitable humidity sensing means are known to the skilled person and not particularly limited.

In embodiments, an acoustic sensor may be provided for measuring an acoustic parameter (e.g. sound or vibration) of the mould or the motion system. Suitable acoustic sensing means are known to the skilled person and not particularly limited.

In embodiments, electric current sensor or other electrical sensing means may be provided for measuring an electric parameter (e.g. electric current, electric potential, magnetism, etc.) of heating device, cooling device, motion system, feeding system, etc.

In embodiments, a flow sensor may be provided for measuring a flow parameter, such as the flow and/or fluid velocity of raw material in the feeding system, raw material in the mould cavity, gas or liquid in the heating/cooling channels, etc.

Other sensing means may comprise sonographic sensing means for measuring a sonographic parameter, such as an image of at least a part of the mould cavity, preferably an ultrasound image. Another sensing means may comprise spectral sensing means, such as UV-Vis or infrared spectroscopy probe, preferably an infrared spectroscopy probe, for measuring a spectral parameter.

Another sensing means may comprise raw material dosing sensing means for measuring a raw material dosing parameter, such as the amount and rate of raw material dosing may be determined by sensing means capable of determining the mass of raw material in a raw material feeding device, such as a hopper. Suitable raw material dosing sensing means are known to the person skilled in the art. Preferred raw material dosing sensing means comprise volumetric and/or gravimetric sensing means.

In embodiments, the control system 40 may be configured for evaluating the collected feedback, i.e. the feedback collected by means of the various sensors described herein. The evaluation of the collected feedback may comprise comparing the at least one process parameter measured during the rotational moulding of the object to at least one predetermined process parameter. The at least one process predetermined parameter may be a value collected at an earlier time than the collected feedback during the rotational moulding of the object. The at least one process predetermined parameter may be a target value for the at least one process parameter.

In embodiments, the control system 40 may be configured for, subsequent to evaluating the collected feedback, adjusting at least one of the temperature-time program 42, the motion-time program 43, the pressure-time program 44, the humidity-time program 45 and/or the dosing-time program 45, preferably at least one of the temperature-time program 42 and the motion-time program 43 that is being applied, based on the evaluation of the collected feedback.

In embodiments, the control system 40 may be configured for, subsequent to evaluating the collected feedback, determining a further temperature-time program 42, a further motion-time program 43, a further pressure-time program 44, a further humidity-time program 45 and/or a further dosing-time program 45, preferably at least a further temperature-time program 42 and/or a further motion-time program 43 to be applied for the rotational moulding of subsequent pieces of said object, based on the evaluation of the collected feedback. It will be understood by the skilled person that the further temperature-time program 42 may be adapted from or partly similar to the temperature-time program 42 that was previously applied for the rotational moulding of a previous piece of the respective object and that the further motion-time program 43 may be adapted from or partly similar to the motion-time program 43 that was previously applied for the rotational moulding of a previous piece of said object. For example, a first temperature-time program that is applied for the rotational moulding of a first piece of an object may also be used or adapted to apply a second temperature-time program for the rotational moulding of a second piece of said object. The further temperature-time program 42 and the further motion-time program 43 may be selected by the user through a user module or may be determined by the control system 40.

In an embodiment, the collected feedback may be transmitted by the control system 40 to and from a remote server 50, such as the 'cloud' or any other computer system that is not directly attached to an input module, which is configured for allowing a user to input data, but over which the user has some degree of control.

As will be explained in more detail further below, a target value for a process parameter may be defined in any form suitable for use in process control, for example as target values for a predetermined timepoint, average value over a predetermined timeframe, minimum and/or maximum value at a certain timepoint, minimum and/or maximum average value over a predetermined timeframe, etc. As described herein in, a timepoint and a timeframe may be in milliseconds, seconds or minutes.

Target values for at least one process parameter may comprise a target value selected from the group consisting of:
- temperature parameters,
- motion parameters,
- pressure parameters,
- spectral parameters,
- electrical parameters,
- flow parameters,
- acoustic parameters,
- sonographic parameters,
- humidity parameters, and
- raw material dosing parameters.

Target values for at least one process parameter may comprise a target value for one or more temperature parameters. Preferred temperature parameters are selected from the group consisting of:
- mould cavity temperature parameters
- mould temperature parameters
- ambient temperature parameters, and
- heating/cooling medium temperature parameters.

It will be understood by the skilled person that a target value for a temperature parameter may be provided in any suitable form, such as comprising or consisting of a specific value, a maximum value and/or a minimum value.

It was found that including one or more mould cavity temperature parameters in the method of the present disclosure may be of significant importance to provide improved process control, as it has been found that the temperature regime the material is subject to during moulding greatly affects the characteristics of the moulded object. Thus, in embodiments, target values for at least one process parameter may comprise a target value for one or more mould cavity temperature parameters. Preferred mould cavity temperature parameters are selected from the group consisting of:
- mould cavity temperature at a predetermined timepoint;
- average mould cavity temperature calculated over a predetermined timeframe, such as between the start of the temperature-time program and a predetermined timepoint, between two predetermined timepoints;
- total time mould cavity temperature is above a predetermined temperature, such as above the melting temperature of the raw material, or above a desired temperature, such as above 100° C., above 125° C. above 150° C., above 175° C., above 200° C., above 225° C., above 250° C., above 275° C., above 300° C. etc.;
- difference between the temperature measured in a first zone of the mould cavity, and the temperature measured in a second zone of the mould cavity, wherein the first and second zone each comprise one or more temperature sensors; and/or
- change in mould cavity temperature calculated over a predetermined timeframe, such as between two predetermined timepoints, within the past 0.001 second, within the past 0.01 second, within the past 0.1 second, within the past second, within the past 10 seconds, within the past 30 seconds, within the past one minute, etc.

The mould cavity temperature parameters as defined herein may be provided for the gas (e.g. air) in the mould and/or for the material being processed in the mould, preferably for the gas.

The skilled person will recognize that if the mould cavity temperature parameter is provided for the gas inside the mould and the total time mould cavity temperature is the maximum mould cavity temperature at any time in the rotational moulding of an object, this value is also known as the peak internal air temperature, or the PIAT.

The mould cavity temperature parameters as defined herein may be provided for one or more temperature sensors individually; or may be provided for the average temperature of a plurality of temperature sensors. For example, if two temperature sensors 25 are integrated in the mould cavity 12, and the target value for mould cavity temperature at a predetermined timepoint is provided, then this means that the target value may be provided for the average value calculated over both sensors (e.g. 80° C. at 5 minutes into the rotational moulding process) or the target value may be provided for each sensor individually (e.g. 85° C. for a first sensor and 75° C. for second sensor at 5 minutes into the rotational moulding process). In an embodiment, the mould cavity temperature parameter is provided for each sensor individually. This allows the method in accordance with the present disclosure to measure and/or control the temperature distribution within the mould. The skilled person will understand that even if the target value is provided for each sensor individually, the target value may be the same for two or more sensors, such as every sensor.

It was found that including one or more mould temperature parameters in the method of the present disclosure may be of significant importance to provide improved process control, as the heat-transfer to or from the object being moulded is in most circumstances primarily dependent on the mould temperature (except in case of e.g. internal cooling by injection of water or a gas into the mould). Thus, in embodiments, providing target values for process parameters comprises providing target values for one or more mould temperature parameters. Preferred mould temperature parameters are selected from the group consisting of:

mould outer surface temperature at a predetermined timepoint mould inner surface temperature at a predetermined timepoint mould wall core temperature at a predetermined timepoint difference between the temperature measured in a first zone of the mould, and the temperature measured in a second zone of the mould, wherein the first and second zone each comprise one or more temperature sensors average mould temperature calculated over a predetermined timeframe, such as between the start of the temperature-time program and a predetermined timepoint, between two predetermined timepoints, within the past 30 seconds, within the past one minute, etc.;

total time mould temperature, preferably mould inner surface temperature is above a predetermined temperature, such as above the melting temperature of the raw material, above a desired temperature, such as above 100° C., above 125° C. above 150° C., above 175° C., above 200° C., above 225° C., above 250° C., above 275° C., above 300° C. etc.; and/or Change in mould temperature calculated over a predetermined timeframe, such as between two predetermined timepoints, within the past 0.001 second, within the past 0.01 second, within the past 0.1 second, within the past second, within the past 10 seconds, within the past 30 seconds, within the past one minute, etc.

The mould temperature parameters as defined herein may be provided for one or more temperature sensors, such as for two, three, four, five or more temperature sensors individually; or may be provided for the average temperature of two, three, four, five or more temperature sensors. For example, if the mould is equipped with two mould core temperature sensors, and the target value for mould core temperature at a predetermined timepoint is provided; this means that the target value may be provided for the average value calculated over both sensors (e.g. 80° C. at 5 minutes into the rotational moulding process) or the target value may be provided for each sensor individually (e.g. 85° C. for a first sensor and 75° C. for a second sensor at 5 minutes into the rotational moulding process). In an embodiment, the mould temperature parameter may be provided for each sensor individually. This allows the method in accordance with the present disclosure to measure and/or control the temperature distribution of the mould. The skilled person will understand that even if the target value is provided for each sensor individually, the target value may be the same for two or more sensors, such as every sensor.

It was found that including one or more ambient temperature parameters in the method of the present disclosure may be of importance to provide improved process control, as this allows measurement and/or control of a number of factors influencing the rotational moulding process, such as efficiency of and/or defect in external cooling (e.g. using fans), room temperature which may affect the heating and cooling cycles, detection of robot arm overheating etc. Thus, in embodiments, providing target values for process parameters comprises providing target values for one or more ambient temperature parameters. Preferred ambient temperature parameters are selected from the group consisting of:

temperature near the mould at a predetermined timepoint, such as within a predetermined distance from the mould wall, within 1 cm from the mould wall, within 2 cm from the mould wall etc.;

room temperature at a predetermined timepoint, such as at a position significantly unaffected by mould heating/cooling systems, more than 20 cm from the mould, more than 50 cm from the mould, at a point outside the mould trajectory, etc.;

temperature at a location on the robot arm associated with the mould at a predetermined timepoint; and/or temperature at a location near one or more raw material feeding devices, such as on, near, or associated with a part of the raw material feeding device, wherein the part of the raw material feeding device is less than 50 cm removed from the mould during feeding, such as less than 25 cm removed, less than 10 cm removed, or contacts the mould during feeding.

The ambient temperature parameters as defined herein may be provided for one or more temperature sensors individually, or may be provided for the average temperature of a plurality of temperature sensors. For example, if the room wherein the robot is operating is equipped with two room temperature sensors, and the target value for room temperature at a predetermined timepoint is provided; this means that the target value may be provided for the average value calculated over both sensors (e.g. 20° C. at 5 minutes into the rotational moulding process) or the target value may be provided for each sensor individually (e.g. 21° C. for a first sensor and 19° C. for a second sensor at 5 minutes into the rotational moulding process). The skilled person will understand that even if the target value is provided for each sensor individually, the target value may be the same for two or more sensors, such as every sensor.

It was found that including one or more heating/cooling medium temperature parameters in the method of the present disclosure may be of importance to provide improved process control, as this allows improved measurement and/or control of mould heating and/or cooling. Thus, in embodiments, providing target values for process parameters comprises providing target values for one or more heating/cooling medium temperature parameters. Preferred heating/cooling medium temperature parameters are selected from the group consisting of:

temperature of a heating medium, such as a heating liquid at a predetermined timepoint, and measured at a specific location, such as before entry into the mould, in the mould, after exiting the mould, in the stock etc.; and/or temperature of a cooling medium, such as a cooling liquid at a predetermined timepoint, and measured at a specific location, such as before entry into the mould, in the mould, after exiting the mould, in the stock etc.

It was found that including one or more motion parameters in the method of the present disclosure may be of importance to provide improved process controls, as this allows measurement and/or control of events impacting mould motion, such as robot wear, faulty programming, etc. Thus, in embodiments, providing target values for process parameters comprises providing target values for one or more motion parameters. Preferred motion parameters are selected from the group consisting of:
- speed of mould rotation at a predetermined timepoint;
- ratio of mould rotation at a predetermined timepoint, wherein the ratio of the mould may be provided by the ratio of speeds around two orthogonal axes, which may be determined by means of a tachometer on the drive of each axis.
- direction of rotation relative to an axis, such as tilting the main axis to a maximum angle between 30 or 45° followed by rotating around the main axis, or "rock n roll" whereby the tilting axis goes back and forth (rocking) while rotating along the main axis (rolling), or other more complex rotations.

It was found that including one or more pressure parameters in the method of the present disclosure may be of importance to provide improved process controls, as the pressurization and depressurization affects foaming and bubble formation, wear and integrity of mould, safety, etc. Thus, in embodiments, providing target values for process parameters comprises providing target values for one or more pressure parameters. Preferred pressure parameters are selected from the group consisting of:
- mould cavity pressure at a predetermined timepoint;
- average mould cavity pressure calculated over a predetermined timeframe, such as between the start of the rotational moulding program and a predetermined timepoint, between two predetermined timepoints, within the past 30 seconds, within the past one minute, etc.;
- total time mould cavity pressure is above a predetermined pressure, such as above 1.1 bar, above 1.2 bar, above 1.5 bar, above 2 bar, above 3 bar, above 10 bar, above 20 bar etc.;
- total time mould cavity pressure is below a predetermined pressure, such as below 0.9 bar, below 0.8 bar, below 0.7 bar, below 0.5 bar, below 0.1 bar, below 0.01 bar etc.;
- change in mould cavity pressure calculated over a predetermined timeframe, such as between two predetermined timepoints, within the past 0.001 second, within the past 0.01 second, within the past 0.1 second, within the past second, within the past 10 seconds, within the past 30 seconds, within the past one minute, etc.;
- pressure of hydraulic and pneumatic actuators at a predetermined timepoint during a motion-time program.

It was found that including one or more spectral parameters in the method of the present disclosure may be of importance to provide improved process controls, as the spectrum observed in the mould cavity may be indicative of physical and/or chemical transformations, such as chemical bond formation or product degradation. Thus, in embodiments, providing target values for process parameters comprises providing target values for one or more spectral parameters. Preferred spectral parameters are selected from the group consisting of:
- overall similarity to a predetermined absorption spectrum, at a predetermined timepoint (also known as fingerprinting);
- presence of absorption in a specific wavelength band at a predetermined timepoint, such as a relative absorption in a specific wavelength band of more than 0.7, more than 0.8, more than 0.9 or more than 0.95 etc.; and/or
- absence of absorption in a specific wavelength band at a predetermined timepoint, such as a relative absorption in a specific wavelength band of less than 0.4, less than 0.3, less than 0.2, less than 0.1, less than 0.01 etc.;
- infrared spectral parameters recorded inside the mould cavity at a predetermined timepoint;
- visible spectral parameters recorded inside the mould cavity at a predetermined timepoint; and/or
- UV spectral parameters recorded inside the mould cavity at a predetermined timepoint.

Preferred spectral parameters comprise or consist of a parameter which may be determined by infrared, visible and/or UV spectroscopy preferably infrared absorption spectroscopy, preferably near-infrared absorption spectroscopy.

It was found that including one or more electrical parameters in the method of the present disclosure may be of importance to provide improved process controls, as this may allow measurement and/or compensation of equipment failures. Thus, in embodiments, providing target values for process parameters comprises providing target values for one or more electrical parameters. Preferred electrical parameters are selected from the group consisting of:
- power consumption;
- heating circuit integrity; and/or
- sensing means integrity, such as temperature sensing means integrity, motion sensing means integrity, pressure sensing means integrity, spectral sensing means integrity etc.

It was found that including one or more sonographic parameters in the method of the present disclosure may be of importance to provide improved process controls, as this may allow measurement and/or control of object wall thickness and wall thickness distribution. Thus, in embodiments, providing target values for process parameters comprises providing target values for one or more sonographic parameters. Preferred sonographic parameters comprise ultrasonography, such as an ultrasonographic parameter at a predetermined timepoint.

It was found that including one or more acoustic parameters in the method of the present disclosure may be of importance to provide improved process controls, as this may allow measurement and/or compensation of equipment failures. Thus, in embodiments, providing target values for process parameters comprises providing target values for one or more acoustic parameters. Preferred acoustic parameters are selected from the group consisting of:
- Sound intensity, such as loudness in decibels (dB);
- Noise intensity, such as motion system noise;

It was found that including one or more flow parameters in the method of the present disclosure may be of importance to provide improved process controls, as this may allow measurement and/or control of events such as overdosing of raw material. Thus, in embodiments, providing target values for process parameters comprises providing target values for one or more flow parameters. Preferred flow parameters are selected from the group consisting of:
- Flow of raw material in the feeding system;
- Flow of raw material in the mould cavity;
- Flow of gas or fluid velocity of liquid in the heating/cooling channels;

It was found that including one or more raw material dosing parameters in the method of the present disclosure may be of importance to provide improved process controls, as this may allow measurement and/or control of events such as overdosing of raw material. Thus, in embodiments, providing target values for process parameters comprises providing target values for one or more raw material dosing parameters. Preferred raw material dosing parameters are selected from the group consisting of:

amount of material dosed at a predetermined timepoint;

type of raw material dosed at a predetermined timepoint;

rate of raw material dosing at a predetermined timepoint;

It was found that including one or more humidity parameters in the method of the present disclosure may be of importance to provide improved process controls, as this may allow measurement and/or control of humidity. Thus, in embodiments, providing target values for process parameters comprises providing target values for one or more humidity parameters. Preferred humidity parameters are selected from the group consisting of:

room humidity at a predetermined timepoint, such as at a position significantly unaffected by mould venting systems, more than 20 cm from the mould, more than 50 cm from the mould, at a point outside the mould trajectory, etc.;

mould cavity humidity at a predetermined timepoint;

The system and method of the present invention are illustrated by the examples set out in Table 1. These examples should be construed as embodiments of the rotational moulding system and method as defined herein before, wherein the control system is further characterized by the information in the table.

TABLE 1

Examples of adjusting at least one of the temperature-time program, the motion-time program, the pressure-time program, the humidity-time program and the dosing-time program that is being applied.

| | Raw material | Sensors for collecting feedback | Suitable program | Target value | Collected feedback | Evaluating the collected feedback | Adjustment | Comment |
|---|---|---|---|---|---|---|---|---|
| 1 | Polymer | Gravimetric raw material dosing sensor | Heating at 2000 Watt between 0-10 minutes into the moulding process | 3550 g of raw material dosed at 30 seconds into the moulding process | 3850 g of raw material dosed at 30 seconds into the moulding process | Overdosing of raw material by 8% | heating at 2200 Watt 45 seconds-10 minutes into the cycle | Overdosing of raw material compensated by increased heating rate |
| 2 | Polymer | Gravimetric raw material dosing sensor | rotational motion began 35 seconds into the moulding process | dosing rate = 0 g/h after 30 seconds into the moulding process | Dosing rate = 200 g/h after 30 seconds into the moulding process | Dosing rate > 0 g/h | rotational motion started 50 seconds into the cycle | Slow dosing of raw material compensated by delay in start of rotational motion |
| 3 | Polymer | Temperature sensors integrated in the mould wall | Heating at 2000 Watt between 0-10 minutes into the moulding process, and then no heating (0 Watt) 10-20 minutes | Mould cavity temperature is 200° C. at minute 8 in the moulding process | Mould cavity temperature is 140° C. at 8 minutes into the moulding process | Mould cavity temperature is too low (should be 200° C.) | Adjust the heating to 4000 Watt between 8-10 minutes into the process. | Slow heating is compensated by increased heating rate |
| 4 | Polymer | Pressure sensors integrated in the mould cavity | No venting | Pressure always above 0.7 bar | Pressure is 0.6 bar at 16 minutes into the moulding process | Pressure too low | Open valve to ambient air | Too large pressure drop during cooling compensated by opening valve to ambient air |
| 5 | Polymer | Pressure sensors integrated in the mould cavity | Open valve 1 to ambient air when pressure is above 2.5 bar; close valve 1 when pressure is below 1.5 bar | Pressure in the range of 1.5-2.5 bar 5-14 minutes into the moulding process | Pressure is 2.7 bar at 10 minutes into the moulding process | Pressure too high | Open valve 2 to ambient air when pressure is above 2.5 bar; clove valve 2 when pressure is below 1.5 bar | Valve 1 malfunction (may be clogged) compensated by switching to valve 2 |
| 6 | Polymer | A first and a second mould external surface temperature sensor, each located at opposite mould walls and indirect cooling means comprising two fans | Cooling 15-24 minutes into the cycle in a position such that each fan airstream is direct at opposite sides of the mould; No motion applied 15-24 minutes into the moulding process. | Average temperature decrease measured by each mould external surface temperature sensor of at least 10° C./min between 15-24 minutes into the moulding process | Average temperature decrease measured by first mould external surface temperature sensor of 12° C./min at 16 minutes into the moulding process Average temperature decrease measured by first mould external surface temperature sensor of 2° C./min at 16 minutes into the moulding process | Average temperature decrease at one side of the mould too low | Apply rotational motion in fan air stream | Fan malfunction detected and compensated by rotating the mould in the air stream generated by the functioning fan |

TABLE 1-continued

Examples of adjusting at least one of the temperature-time program, the motion-time program, the pressure-time program, the humidity-time program and the dosing-time program that is being applied.

| | Raw material | Sensors for collecting feedback | Suitable program | Target value | Collected feedback | Evaluating the collected feedback | Adjustment | Comment |
|---|---|---|---|---|---|---|---|---|
| 7 | Polymer | Infrared sensor | Heating at 3000 Watt 10-20 minutes into the moulding process | No or limited detection of polymer oxidation products by infrared spectroscopy | Significant detection of polymer oxidation products by infrared spectroscopy | Too many oxidation products formed | Heating at 2000 Watt 10-25 minutes | Undesired formation of oxidation products compensated by reducing heating intensity and increasing heating duration |

In the embodiment shown in FIG. 5, the control system 40 may comprise a raw materials database 41 containing data sheets of a plurality of raw materials.

Figure 6:
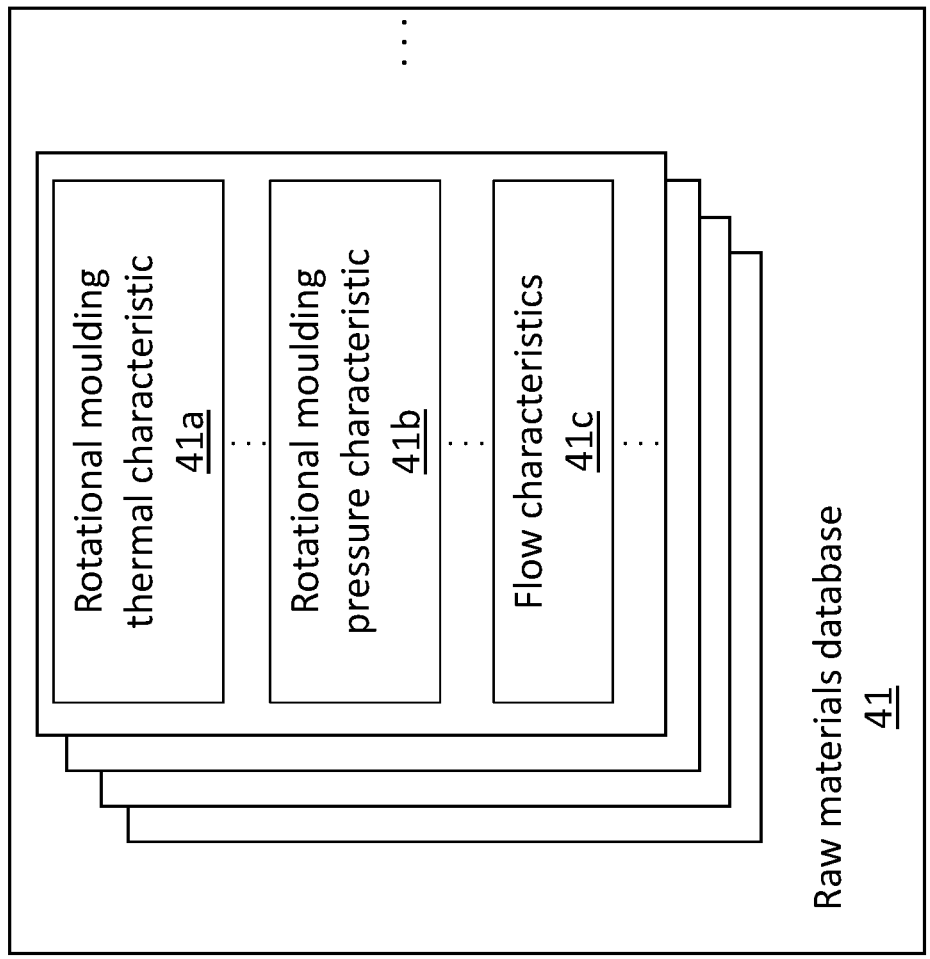
FIG. 6 shows a schematic diagram illustrating a raw materials database.

FIG. 6 shows an embodiment of a raw materials database containing data sheets of at least one raw material, wherein each raw material is associated with at least one material property. The at least one raw material property may comprise a property selected from the group consisting of: type of material, thermal behaviour properties, physical processing properties, polymer properties, impurity properties and additive properties. The at least one raw material may preferably be associated with type of material and thermal behaviour properties.

The at least one raw material property may comprise a polymer property selected from the group consisting of: degree of polymerization, chain length distribution, tacticity, and copolymerization parameters.

The at least one raw material property may comprise an impurity property selected from the group consisting of: residual solvent content, and moisture content.

The at least one raw material property may comprise the type and amount of additive comprised in the material, such as the type and amount of an additive selected from the group consisting of blowing agents, stabilizers such as antioxidants or light stabilizers; curing agents such as catalysts or accelerators; flame retardants; lubricants; antistatic agents; clarifying agents; nucleating agents and demoulding agents.

The at least one raw material property may comprise a physical processing property selected from the group consisting of: particle size, density, specific surface area, powder flow properties.

The at least one raw material property may comprise a thermal behaviour property selected from the group consisting of: viscosity at one or more temperatures, melt flow index, curing behaviour, melting point, crystallization temperature, glass transition temperature. The skilled person will understand that many polymers may not have a well-defined melting point or glass transition temperature, and that these properties may be provided as a range.

Each data sheet comprises at least one rotational moulding thermal characteristic 41a, and optionally at least one rotational moulding pressure characteristic 41b, flow characteristics of the material 41c and/or other characteristics, preferably, at least one rotational moulding thermal characteristic. The control system 40 may be provided for connecting to a (remote) server 50 where the raw materials database may be stored, to obtain the data sheets for each raw material.

In embodiments, each rotational moulding thermal characteristic may be segmented and each segment may be determined based on at least one raw material thermal behaviour during the rotational moulding of an object, and each segment may be approximated by a mathematical function as described herein.

In embodiments, the at least one rotational moulding thermal characteristic may be provided in any form which provides information about the rotational moulding behaviour of the raw material. The rotational moulding thermal characteristics may comprise information on the relationship between the mould surface temperature and/or the power supplied to the mould heating and cooling system and the mould cavity temperature during the rotational moulding of an object.

In embodiments, the at least one rotational moulding pressure characteristic may be provided in any form which provides information about the rotational moulding behaviour of the raw material. The rotational moulding pressure characteristics may comprise information on the relationship between the power supplied to the pressure system and the mould cavity pressure during the rotational moulding of an object, the relationship between the power supplied to the humidity system and the mould cavity humidity during the rotational moulding of an object, the relationship between the power supplied to the humidity system and the mould cavity pressure during the rotational moulding of an object, and/or the relationship between the power supplied to the pressure system and the mould cavity humidity during the rotational moulding of an object.

In embodiments, the raw materials database 41 may contain data sheets of a plurality of raw materials, wherein each of said data sheets in the raw materials database may comprise for each raw material the at least one rotational moulding thermal characteristic comprising data points for mould cavity temperature and/or raw material temperature and time during a specific rotational moulding of an object, e.g. rotational moulding of one or more predefined or standard objects using a predefined or standard rotational moulding process. The data sheets may further comprise for each raw material at least one rotational moulding pressure characteristic comprising data points for mould cavity pressure, mould cavity humidity and time during said specific rotational moulding of an object.

Embodiments of rotational moulding thermal characteristics and how they may be used in the embodiments of rotational moulding systems and methods, and simulation systems and methods described herein, will be described with reference to FIGS. 7a, 7b and 7c.

As described herein, the temperature of the mould may be controlled by at least one predefined temperature-time program 42 for the rotational moulding of an object, which comprises instructions for varying e.g. electrical power to a heating-cooling system 20 for the rotational moulding of an object. Simultaneously, the motion of the mould may be controlled by at least one predefined motion-time program 43 for the rotational moulding of the object, which comprises instructions for varying the movements applied to the mould by means of a motion system 30 for the rotational moulding of the object. FIG. 7a shows how the control system 40 may determine or select a suitable temperature-time program 42 and/or a suitable motion-time program 43 on the basis of the (target) rotational moulding thermal characteristic 41a that is to be achieved, which is in this embodiment a "mould cavity temperature-time profile" which can in use be measured by means of an internal air temperature measurement. On the basis of the rotational moulding thermal characteristic, and possibly involving evaluation of other parameters such as mould characteristics as described herein, sensor feedback as described herein, etc., the control system 40 may, as an optional first step, determine the mould temperature-time profile of the mould, which is the temperature over time to which the mould needs to be heated or cooled such that the mould cavity temperature approaches the target thermal characteristic. In the embodiment shown, the heating/cooling system is provided (at least partly) on the outside of the mould, hence the "mould surface temperature-time profile" 111. In other embodiments, the mould temperature-time profile considered may also involve other parts or measurement points on the mould, such as for example the inner surface temperature, depending on the heating/cooling system that is provided for heating/cooling the mould.

In cases where the mould characteristics are already known and/or a direct relationship between the mould cavity temperature 41a and the heating/cooling power 42 is known, e.g. has been previously determined, the step of determining the mould temperature-time profile 111 may be omitted. Such a direct relationship may for example be a predefined value or delay representing the thermal inertia of the material of the mould, i.e. taking into account the thermal response time before a heating or cooling of the mould wall has effect on the cavity temperature.

On the basis of the rotational moulding thermal characteristic 41a, in particular e.g. the mould cavity temperature-time profile and/or the derived mould surface temperature-time profile 111, the control system 40 may determine at least one suitable temperature-time program 42, to be applied to the mould by means of the heating and cooling system 20, and/or at least one suitable motion-time program 43, to be applied to the mould by means of the motion system 30, preferably a robot arm. FIG. 7a shows an example of a temperature-time program 42 wherein different levels of heating power are applied during heating of the mould and different levels of cooling power are applied during cooling of the mould. As shown, cooling power may be applied before the mould cavity temperature reaches its maximum so as to avoid an overshoot of the PIAT, which may be a constraint for the rotational moulding process. The control system 40 may determine or select the temperature-time program 42 to be applied, or may determine or select a limited set of options of temperature-time programs 42 and present those to an operator of the rotational moulding system, so that the operator can select the final temperature-time program to be applied based on his/her own knowledge or experience.

Using a similar approach, the control system 40 may determine a suitable motion-time program 43 to be applied in conjunction with the temperature time program 42, i.e. when the mould needs to undergo which movement for optimal distribution of the raw material within the mould and/or to achieve certain variations in wall thickness of the moulded object, possibly taking into account the flow characteristics 41c of the raw material. FIG. 7a shows an example of a motion-time program 43 wherein different movements are applied during the rotational moulding process. As shown, also the intensity or speed of the applied movement may be varied.

The present inventors have surprisingly found that it is not necessary to include a complete set of data points of the rotational moulding thermal characteristic, in particular the mould cavity temperature-time profile 41a. It has been found that the rotational moulding thermal characteristic may be segmented and the segments approximated by mathematical functions. Each segment and/or transition between segments may be determined based on at least one raw material thermal behaviour during the rotational moulding of an object, such as the melting point and peak internal air temperature (PIAT), preferably at least the PIAT reached in the mould cavity temperature-time profile 41a. Each segment may be approximated by a mathematical function. In embodiments, each mould cavity temperature-time profile 41a may be segmented in the same way, such that each segment may be represented by a mathematical function comprising one or more parameters, and the at least one rotational moulding thermal characteristic provided on the raw material data sheets in the database 41 may be provided as one or more values for these one or more parameters. Similarly, each rotational moulding pressure characteristic may be segmented and each segment may be approximated by a mathematical function. A pressure-time profile and/or a humidity-time profile for a specific rotational moulding of an object may be segmented such that each segment may be represented by a mathematical function comprising one or more parameters, and at least one rotational moulding pressure characteristic is provided as one or more values for these one or more parameters. Thus, it is possible to store one or more mathematical functions and one or more values for parameters comprised in each mathematical function rather than a large amount of data points for representing the target mould cavity temperature-time profile 41a, pressure-time profile 41b, humidity-time profile etc. for a specific rotational moulding of an object. Thus, it is possible to reduce the amount of data stored in the raw materials database and the amount of storage needed, and also to increase computational efficiency.

In embodiments, the approximation of each segment by a mathematical function may be performed by curve fitting techniques, such as, regression analysis, that avoid overfitting and underfitting of the data points. It will be understood by the skilled person that a mathematical function may comprise a linear or a nonlinear function. The mathematical function may be selected from the group comprising linear, exponential and logarithmic functions and polynomials.

In embodiments, each rotational moulding thermal characteristic and each rotational moulding pressure characteristic may be segmented into two or more segments, preferably, two or more, three or more, four or more, five or more, six or more, seven or more, eight or more, nine or more, or ten or more. The skilled person will understand that having more segments for a rotational moulding thermal characteristic will result in a more accurate approximation of the temperature-time profiles, and that having less segments will result in less needed storage. The skilled person will understand that having more segments for a rotational moulding pressure characteristic will result in a more accurate approximation of the pressure-time profiles or the humidity-time profiles, and that having less segments will result in less needed storage.

In embodiments, each segment may be represented by at least two points, preferably comprising begin and end points. The skilled person will understand that having more points for a rotational moulding thermal characteristic will result in a more accurate approximation of the temperature-time profiles, and that having less points will result in less needed storage. The skilled person will understand that having more points for a rotational moulding pressure characteristic will result in a more accurate approximation of the pressure-time profiles or the humidity-time profiles, and that having less points will result in less needed storage.

Preferably, for the rotational moulding thermal characteristic $41a$, at least one temperature critical segment is defined where the thermal characteristic is approximated more closely than in other segments and the at least one temperature critical segment is approximated by a second order, third order or higher order mathematical function whereas the other segments are approximated by first order mathematical functions. An example of a temperature critical segment is the part of the thermal characteristic between the melting point and the PIAT.

Figure 7B:
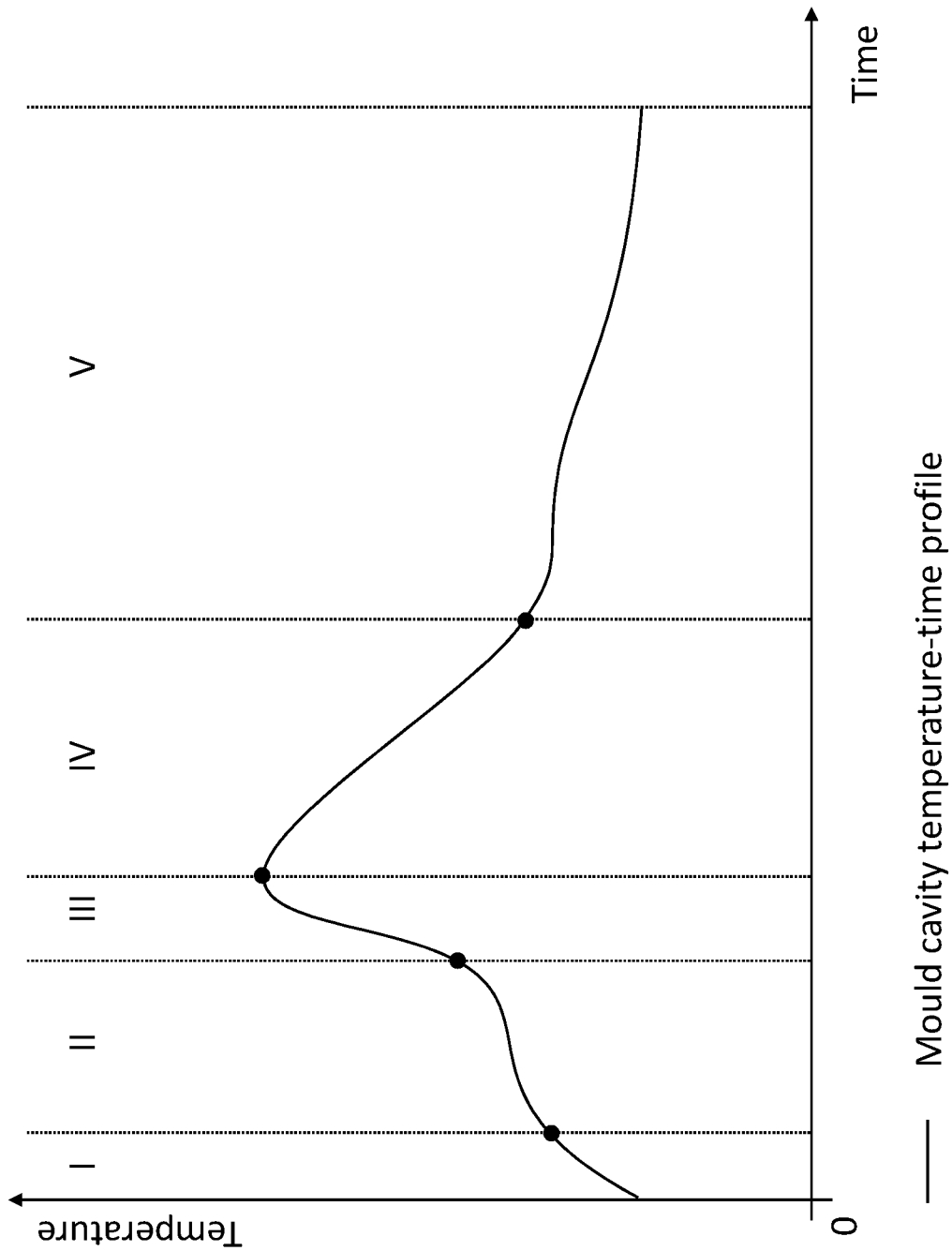
FIG. 7 shows a schematic representations of rotational moulding thermal characteristics, showing (7*a*) a rotational moulding thermal characteristic and a mould surface temperature-time profile, a temperature-time profile and a motion-time profile determined on the basis thereof, (7*b*) the segmentation of a rotational moulding thermal characteristic, and (7*c*) the segmentation and approximation of a rotational moulding thermal characteristic.
Figure 7C:
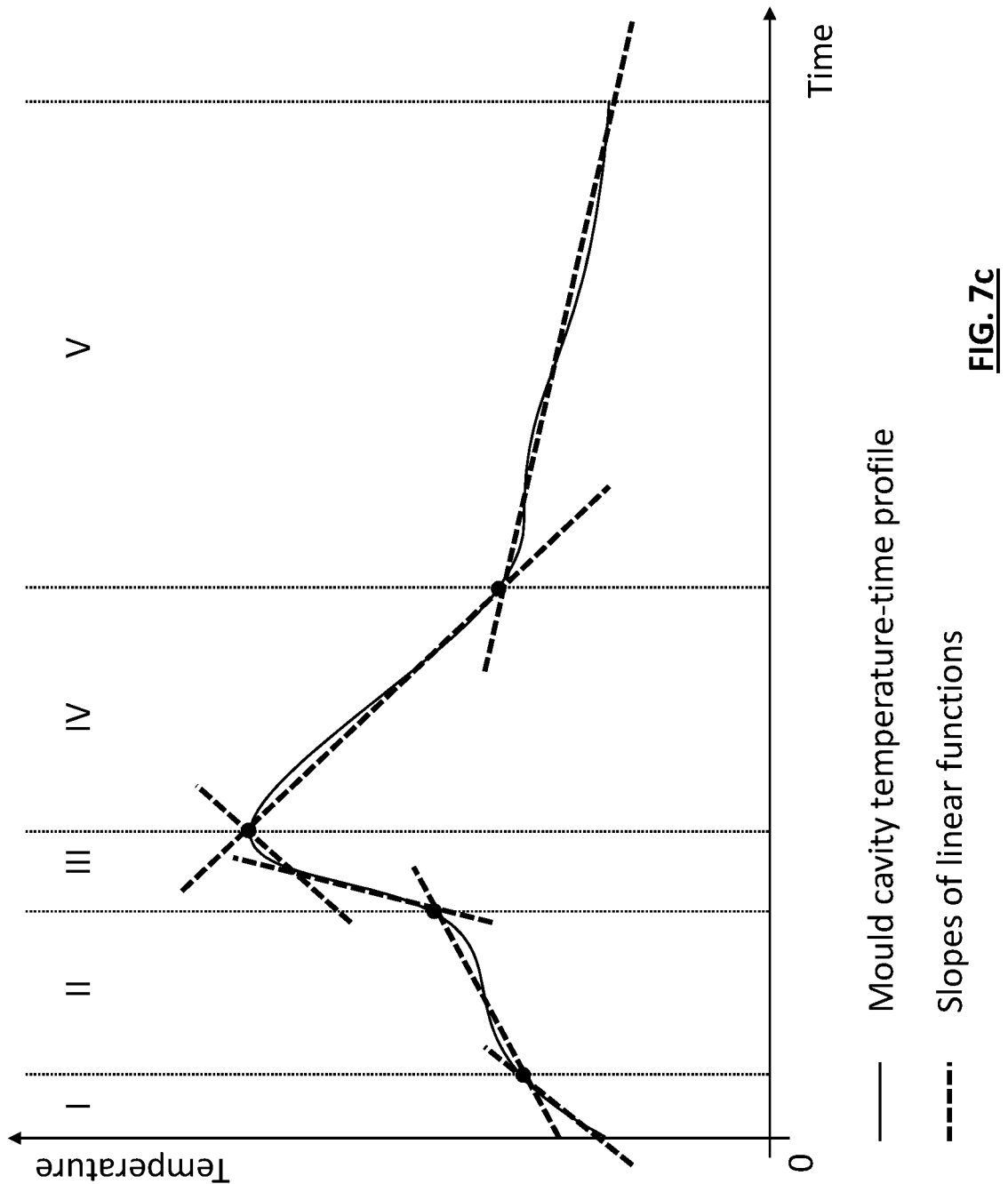

FIGS. 7b and 7c show a mould cavity temperature-time profile $41a$ that is segmented into five segments. The segments may be determined based on at least one raw material thermal behaviour during the rotational moulding of an object as follows. The first segment may be defined from the start of the rotational moulding until the start of the melting process of a raw material. The second segment may be defined as the melting process of the raw material. The third segment may be defined from the end of the melting process of the material until the peak internal air temperature (PIAT) reached in the mould cavity temperature-time profile $41a$ during the rotational moulding. The fourth segment may be defined from the PIAT reached in the mould cavity temperature-time profile $41a$ until the end of the solidification of the melted material. The fifth segment may be defined from the end of the solidification of the melted material until demoulding.

The profiles of FIGS. 7b and 7c may be represented in the database 41 by the coordinates of the transition points of the segments, i.e. their begin and end points, in combination with one or more parameter values for the mathematical functions which are determined for approximation of the respective segment. In the embodiment of FIG. 7b, each segment I-V is approximated by a higher order mathematical function (not shown), for example by curve fitting. In the embodiment of FIG. 7c, segments I, II, IV and V are approximated by a single first-order function and segment III is approximated by two first-order functions, so the representation in the database can be reduced to the coordinates of the intersections/transition points between these first-order functions (as their slopes can be derived therefrom).

In embodiments, a correlation may be determined between a mathematical function of each segment and one or more object properties. Thus, it is possible to take into account the temperature-time aspect of the material in the rotational moulding process, and, as a result, it is possible to provide a more accurate means to gauge said one or more object properties when using said raw material.

In embodiments, a correlation may be determined between parameters of a mathematical function of each segment and one or more object properties. The rotational moulding thermal characteristic for a material may affect one or more object properties. More particularly, the shape of a mould cavity temperature-time profile $41a$ may be controlled to achieve particular object properties. This is critical for instance when using multiple moulds on one robot arm that may have slight variations in the mould properties or in the raw material being used.

Another aspect of the present disclosure provides embodiments of a system and computer-implemented method for simulating a rotational moulding process. A first embodiment of the computer simulation system and method for simulating a rotational moulding process according to the disclosure will be described with reference to FIG. 8. The computer simulation system 2 comprises a virtual mould 3, a virtual mould heating and cooling system 4 provided for applying a temperature-time program to the virtual mould 3, and a virtual motion system 5 provided for applying a motion-time program to the virtual mould 3.

In an embodiment, the computer simulation system is configured for determining at least one simulation variable on the basis of a simulation of the rotational moulding of the object by means of the virtual rotational moulding system 2 and a predetermined rotational moulding thermal characteristic of a raw material, for example a raw material that is selected by a user with the intent of producing an object by means of a rotational moulding process with said raw material and first testing the rotational moulding process by means of the simulation system.

The virtual mould 3 is used for simulating the rotational moulding of an object, and may be associated with at least one mould property, comprising a property selected from the group consisting of: wall, cavity, material, shape, weight, volume, surface area, wall thickness, and design details (e.g. corner angles, corner radii, steps, recesses, kiss-offs, undercuts, ribbings, drafts, crowns). The virtual mould 3 is preferably associated with a mould wall surrounding a mould cavity. The mould wall may be simulated to comprise or consist of any suitable material, such as aluminum or electroformed nickel, preferably aluminum. The virtual mould may be designed by the user, or adjusted by the user based on a predefined mould design, or designed by the system based on a design of an object to be moulded, and adapted or optimized on the basis of simulations performed by the simulation system 2.

In embodiments, the mould properties may be determined as follows. The wall, cavity, shape and design details may be determined by a 3D imaging device, such as a laser or light scanners capable of scanning and delivering data to a central processing unit for producing high resolution 3D images of the object and/or a pre-existing mould. The material may be in the form of a chemical name, chemical family, synonyms, chemical function, chemical components and/or material use. The weight and center of gravity may be in the form of data points describing the mass distribution within an object and may be in the form of measurements using a load cell. The volume and surface area may be in the form of data points describing the volume or surface area of parts of an object and may be determined using the 3D image of the object and/or a pre-existing mould. The wall thickness may be in the form of data points describing the wall thickness distributions for parts of an object and/or pre-existing mould and may be in the form of measurements using ultrasonic sensing or the 3D image of the object and/or a pre-existing mould.

In embodiments, the object may be associated with at least one object property. The at least one object property may comprise a property selected from the group consisting of: shape, material, weight, center of gravity, volume, surface area, density, wall thickness, moisture content, impact toughness, stiffness and stress resistance, hardness, bubble content, porosity, surface appearance, surface color, degree of cure, shrinkage, and compressive strength, preferably shape, volume, surface area and wall thickness.

In embodiments, the object properties may be determined as follows. The shape may be determined by a 3D imaging device, such as a laser or light scanners capable of scanning and delivering data to a central processing unit for producing high resolution 3D images of the object. The material may be in the form of a chemical name, chemical family, synonyms, chemical function, chemical components and/or material use. The weight and center of gravity may be in the form of data points describing the mass distribution within an object and may be in the form of measurements using a load cell. The volume and surface area may be in the form of data points describing the volume or surface area of parts of an object and may be determined using the 3D image of the object. The density may be determined from the weight and volume. The wall thickness may be in the form of data points describing the wall thickness distributions for parts of an object and may be in the form of measurements using ultrasonic sensing or the 3D image of the object. The moisture content may be in the form of data points describing moisture content in parts of an object during and optimally after equilibrium process with the relative humidity of the object's surrounding environment and may be a measurement by a moisture sensor. The impact toughness may be in the form of data points of impact toughness at parts of an object and may be a measurement using a Charpy test, Izod test or dart impact on said parts of an object. The stiffness and stress resistance may be in the form of data point describing the resistance of parts of an object when applied tension and may be in the form of a measurement by a tensile test. The hardness may be in the form of data points describing hardness of parts of an object and may be in the form of measurements using a durometer. The bubble content may be in the form of data points describing the bubble content in parts of an object and may be in the form of a measurement using ultrasonic detectors. The porosity may be in the form of data points describing the porosity of the exterior in parts of an object and may be in the form of a measurement using a porosimeter. The surface appearance may be in the form of data points describing the texture of the exterior and/or interior in parts of an object and may be in the form of a measurement using an ultrasonic detector. The surface color may in the form of data points describing the color of the exterior and/or interior in parts of an object and may be in the form of a measurement using a colorimeter. The degree of cure may be in the form of data points describing the degree of cure of parts of an object and may be in the form of a measurement using a dielectrometer, an ultrasonic detector or a Fourier-transform infrared or Raman spectrometer. The shrinkage may be in the form of data points describing the degree of shrinkage of parts of an object and may be in the form of a measurement of object shape and internal shape of a respective mould. The compressive strength may be in the form of data points describing the resistance of parts of an object when applied compression and may be in the form of a measurement using a universal testing machine.

In embodiments, the virtual mould 3 may be defined using a computer-aided design (CAD) software or digital modelling software executable on a general purpose computer, or by simply providing one or more mould properties described herein before. The object may be also defined using a CAD or digital modelling software or by simply providing one or more object properties described herein before. The one or more mould properties are invariably relative to the respective object, preferably the shape, volume and surface area.

In embodiments, the virtual mould heating and cooling system 4 may be at least partly integrated with the mould wall and provided to applying a temperature-time program to the virtual mould to control (simulate heating and cooling) the temperature of the virtual mould 3. Integrating the virtual mould heating and cooling system 4 at least partly with the mould wall can be realized by different methods, for example by using the computer-aided design (CAD) software or digital modelling software executable on a general purpose computer to define the virtual mould heating and cooling system being at least partially integrated into the wall of the virtual mould 3 or being mounted onto an outer side of the mould wall or onto an inner side of the mould wall.

In embodiments, the virtual mould heating and cooling system 4 may comprise one or more heating and/or cooling devices for simulating the heating and/or cooling of the wall of a virtual mould 3. The virtual mould heating and cooling system 4 may comprise but is not limited to the one or more heating and/or cooling devices comprised in a mould heating and cooling system 20 as described herein before. The CAD or digital modelling software may be used to define the number and type of the one or more heating and/or cooling devices as well as the location of the one or more heating and/or cooling devices with respect to the virtual mould 3 and the mould wall.

In embodiments, the virtual mould heating and cooling system 4 may be provided for a applying temperature-time program to a particular part of the virtual mould 3, without disturbing or adversely affecting the temperature-time programs of the other parts of the virtual mould 3. In particular, by applying different temperature-time programs to parts of the virtual mould 3, each part of the virtual mould can be heated or cooled independently of the other parts of the virtual mould. Thus, temperature-time programs may thus be chosen for each part of the virtual mould 3 independently of the other parts. For example, it may be simulated to provide a liquid at one temperature in a first channel, a gas at another temperature in a second channel, the channels being integrated in different parts of the virtual mould.

In embodiments, the virtual motion system 5 to which the virtual mould connectable is preferably a virtual robot arm provided for applying a motion-time program to the virtual mould 3. The virtual motion system may be provided for but is not limited to applying the motion-time program by means of motion systems as described herein before. The motion-time program may refer to a set of instructions provided to the virtual motion system 5 which results in a simulation of predetermined intensities, time periods and types of movements being applied to the virtual mould. It will be understood by the skilled person that a motion-time program may comprise periods wherein no movement is applied to the virtual mould.

Figure 8:
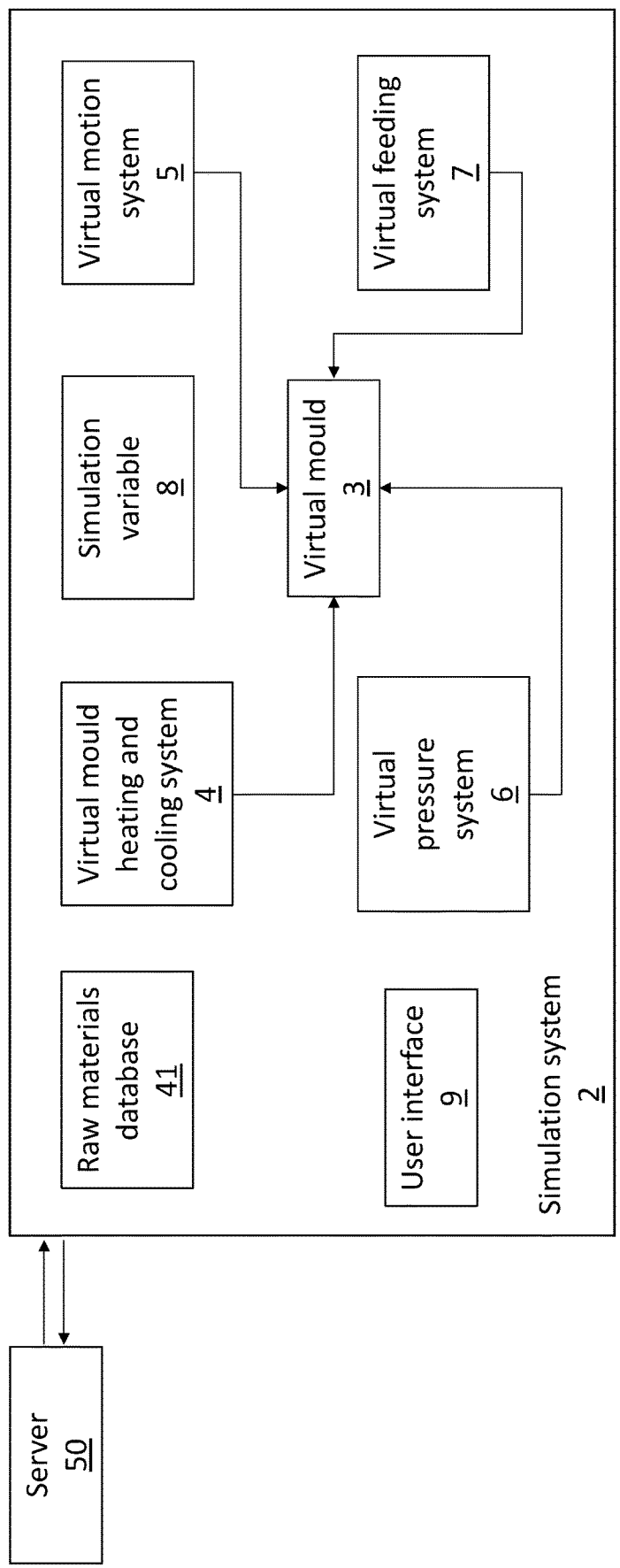
FIG. 8 shows a schematic diagram illustrating a simulation system.

As shown in FIG. 8, the computer simulation system 2 may comprise a virtual pressure system 6 configured for applying a pressure-time program to the cavity of a virtual mould. A pressure-time program may refer to a set of instructions which results in a simulation of predetermined intensities and time periods of pressure being applied to the mould cavity. It will be understood by the skilled person that a pressure-time program may comprise periods wherein no change in pressure occurs in the virtual mould which may result in the mould cavity pressure remaining relatively stable, decreasing or increasing.

In embodiments, the virtual pressure system may be configured for applying a humidity-time program to the cavity of a virtual mould. A humidity-time program may refer to a set of instructions provided which results in a simulation of predetermined intensities and time periods of humidity being applied to the mould cavity. It will be understood by the skilled person that a humidity-time program may comprise periods wherein no change in pressure occurs in the virtual mould which may result in the mould cavity humidity remaining relatively stable, decreasing or increasing.

In the embodiment shown, the computer simulation system may comprise a virtual feeding system 7 configured for applying a dosing-time program for controlling raw material dosing comprising the type of raw material dosed. A dosing-time program may refer to a set of instructions which results in a simulation of controlling the type of raw material dosed, the rate of raw material dosing and/or the amount of raw material dosed, etc.

In embodiments according to the present disclosure, the simulation system may be configured to perform unsupervised learning, wherein a function is inferred for describing 'unlabeled' data (i.e., data that has not been classified), and no explicit outputs are associated with each input in the data. For example, a hidden structure is learned on data containing object properties to determine classes in the data. Such classes may refer to the quality of a moulded object ('Good', 'Satisfactory', 'Bad', etc.), and are 'hidden' and not explicitly found in the data. Thus, a learned hidden structure may be used to classify a 'new' object into one of the classes based on the object parameters of said object. Other examples comprise learning a hidden structure on data containing a plurality of properties, and classifying 'new' data into classes referring to price class, difficulty, energy efficiency, etc.

In embodiments, the simulation system may preferably perform supervised learning, wherein a function is learned to represent inputs with outputs based on available input-output pairs in the data, and predict at least one simulation variable based on a 'new' value of the input. For example, a function is learned to represent inputs of time-temperature programs and motion-time temperature programs of respective virtual moulds with outputs of mould cavity time-temperature profiles. Thus, a learned function may be used to predict a mould cavity time-temperature profile based on a 'new' input of a time-temperature program and motion-time temperature program of a virtual mould. Another example may be where the inputs comprise mould cavity time-temperature profiles of virtual moulds and outputs comprise time-temperature programs and motion-time temperature programs of respective virtual moulds, and the goal is to predict said programs for a 'new' mould cavity time-temperature profile of a virtual mould. Other examples comprise one or more object properties, one or more mould properties, one or more raw material thermal behaviour properties, one or more rotational moulding programs etc.

In supervised or unsupervised learning, the data may be gathered in a single database or multiple databases that may be connected, e.g. via the 'cloud'.

Figure 9:
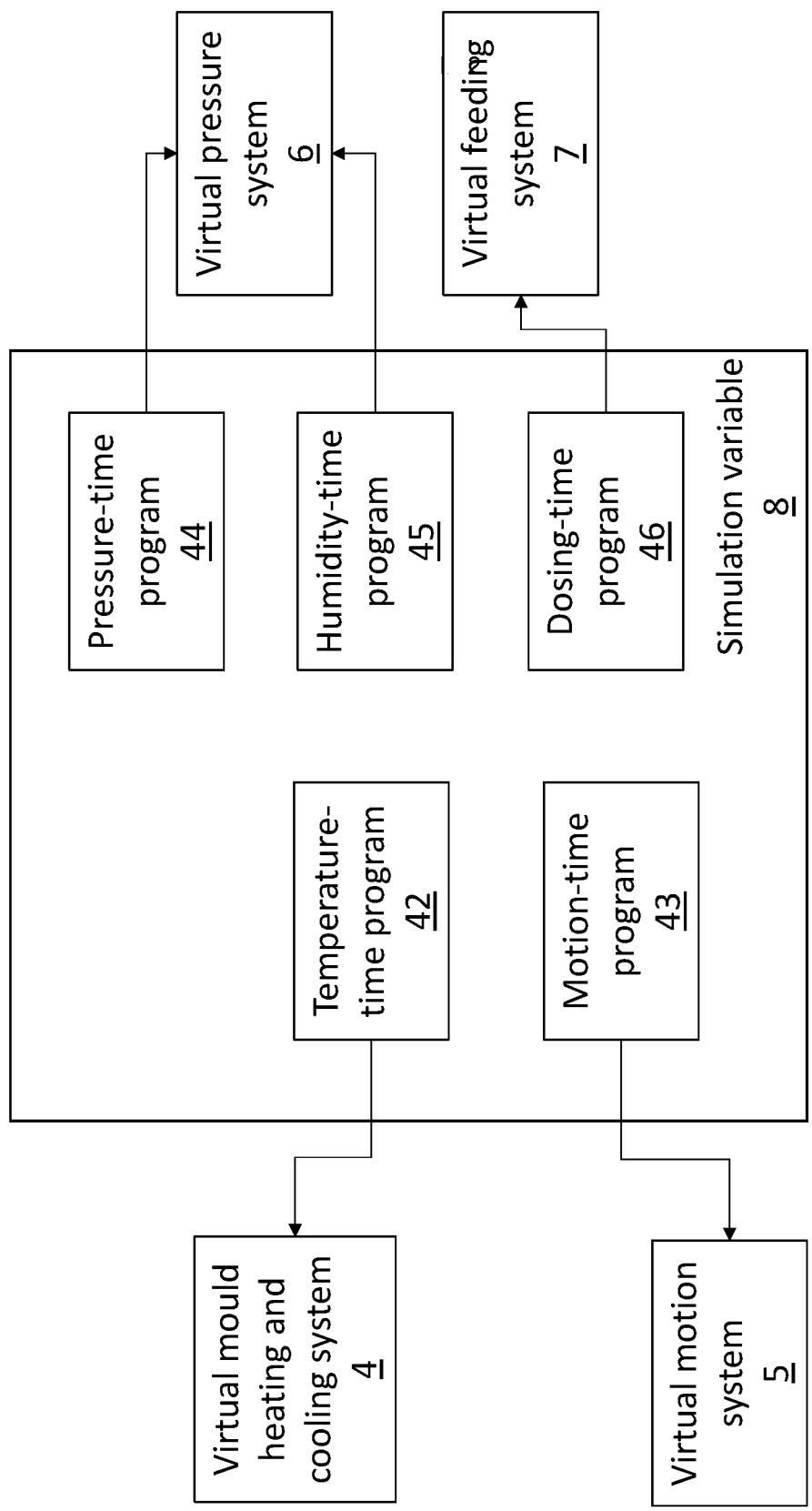
FIG. 9 shows a schematic diagram illustrating a set of simulation variables.

FIG. 9 shows a detail of a part of the at least one simulation variable to which the rotational moulding simulation may be targeted, which may comprise one or more variables selected from the group consisting of the process parameters as described herein before, preferably from the group consisting of:
  object properties as defined herein before;
  raw material properties, comprising rotational moulding thermal characteristics as defined herein before;
  mould properties as defined herein before;
  temperature-time program;
  motion-time program;
  pressure-time program;
  pressure-time profile;
  humidity-time program;
  humidity-time profile;
  dosing-time program;
  other rotational moulding programs, etc.

The at least one simulation variable may comprise a suitable object property, preferably shape, volume, surface area and wall thickness. The at least one simulation variable may comprise a suitable raw material property, preferably, a raw material behaviour property comprising a rotational moulding thermal characteristic. The at least one simulation variable may comprise a suitable mould property, preferably mould wall and mould cavity.

In the embodiment shown, the at least one simulation variable may preferably comprise a suitable temperature-time program 42. The suitable temperature-time program 42 may be preferably applied by the virtual mould heating and cooling system 4 for the simulation of the rotational moulding of the object by means of the virtual rotational moulding system and preferably applied by the mould heating and cooling system for the rotational moulding 20 of an object by means of the rotational moulding system 1. The suitable temperature-time program 42 may be a basis for defining the virtual mould 3 and the virtual heating and cooling system 4, preferably the virtual heating and cooling system 4 is at least partly integrated in the mould wall. The suitable temperature-time program 42 may be provided for determining a suitable number and location of heating and/or cooling channels to be integrated in or on the virtual mould 3.

In the embodiment shown, the at least one simulation variable may preferably comprise a suitable motion-time program 43. The suitable motion-time program 43 may be preferably applied by the virtual motion system 5 for the simulation of the rotational moulding of the object by means of the virtual rotational moulding system and preferably applied by the motion system 30 for the rotational moulding of an object by means of the rotational moulding system 1. The suitable motion-time program 43 may be a basis for defining the virtual mould 3 and the virtual heating and cooling system 4, preferably the virtual heating and cooling system 4 is at least partly integrated in the mould wall.

In the embodiment shown, the at least one simulation variable 8 may comprise a suitable pressure-time program 44. The suitable pressure-time program 44 may be preferably applied by the virtual pressure system 6 for the simulation of the rotational moulding of the object by means of the virtual rotational moulding system and preferably applied by the pressure system 60 for the rotational moulding of an object by means of the rotational moulding system 1. The suitable pressure-time program 44 may be a basis for defining the virtual mould 3 and the virtual pressure 6.

In the embodiment shown, the at least one simulation variable 8 may comprise a suitable humidity-time program 45. The suitable humidity-time program 45 may be preferably applied by the virtual pressure system 6 for the simulation of the rotational moulding of the object by means of the virtual rotational moulding system and preferably applied by the pressure system 60 for the rotational moulding of an object by means of the rotational moulding system 1. The suitable humidity-time program 45 may be a basis for defining the virtual mould and the virtual pressure system 6.

In the embodiment shown, the at least one simulation variable 8 may comprise a suitable dosing-time program 46. The suitable dosing-time program 46 may be preferably applied by the virtual feeding system 7 for the simulation of the rotational moulding of the object by means of the virtual rotational moulding system and preferably applied by the feeding system 70 for the rotational moulding of an object by means of the rotational moulding system 1. The suitable dosing-time program 46 may be a basis for defining the virtual mould 3 and the virtual feeding system 7.

Figure 10:
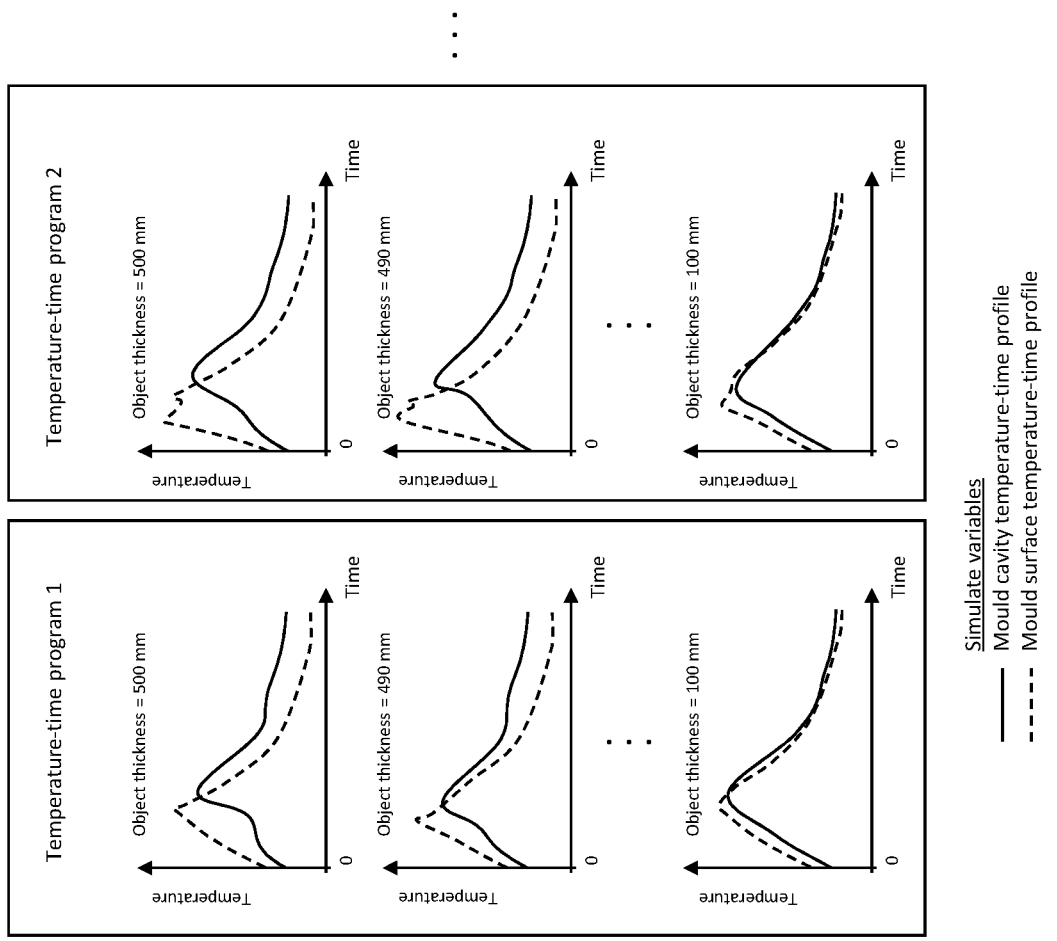
FIG. 10 shows a schematic representation of a repeated simulation of temperature-time programs and object thickness.

FIG. 10 shows an embodiment of the simulation system 2 configured to repeat the simulation of the at least one simulation variable 8. It will be understood by the skilled person that the simulation of at least one simulation variable is equivalent to repeating the simulation of each simulation variable while fixing the other simulation variables. In the embodiment shown, the at least one simulation variable comprises temperature-time program and wall thickness of the resulting object, and the simulation system is configured to repeat the simulation of the temperature-time program and the object thickness, whereby the temperature-time program is fixed and the simulation of the object thickness is repeated for each fixed temperature-time program, or the object thickness is fixed and the simulation of the temperature-time program is repeated for each fixed object thickness.

In the embodiment shown, the at least one simulation variable 8 may be simulated in a parallel and/or an iterative process. The simulation variable 8 may be simulated in a parallel or an iterative process with respect to the other simulation variables. For example, two or more simulation variables are each simulated in parallel, or each of the two or more simulation variables is simulated one after the other. The simulation variable 8 may be simulated in a parallel or an iterative process with respect to a range of values of the other simulation variables. For example, the simulation variable is simulated by fixing each of the other simulation variables to a first value, while said simulation variable is simulated in parallel by fixing each of the other simulation variables to a second value. The results produced from each simulation may be stored in data sheets contained in a database or on a server.

In embodiments, the simulation system 2 may be configured to determine an optimal or near optimal value from the repeated simulation of the at least one simulation variable 8. This may be known as simulation-based optimization. For example, after a suitable temperature-time program 42 is determined, the simulation may be repeated for determining an optimal or a near optimal definition of a virtual mould 3 integrated part of the virtual heating and cooling system 4 on the basis of the suitable temperature-time program 42. The simulation may be further repeated using the suitable virtual mould and integrated part of the virtual heating and cooling system to improve the determining of the virtual mould and integrated part of the virtual heating and cooling system or to determine suitable results of other simulation variables.

In embodiments, the simulation system 2 may suggest to a user a list of choices of an optimal or near optimal results of the at least one simulation variable, preferably one or more temperature-time programs and/or one or more motion-time programs, the choices being predetermined or being results of repeated simulations. The suggestion by the simulation system may be used to repeat the simulation and determine other simulation variables or suggest for each at least one simulation variable one result. For example, the suggestion of one or more temperature-time programs and/or one or more motion-time programs may be used by the simulation system to repeat the simulation based on new data or changes in the rotational moulding process and to suggest an optimal temperature-time program and/or motion-time program.

In embodiments, the simulation of at least one simulation variable comprises monitoring the at least one simulation variable in real-time during the rotational moulding process. Thus, the simulation module is configured to simulate the at least one simulation variable in real-time. This is known as optimization control or dynamic optimization. An approach for simulating a simulation variable in real-time is reinforcement learning. Reinforcement learning allows the simulation module to learn a behavior of a simulation variable based on feedback or partial feedback from the rotational moulding of an object. For instance, a rotational moulding program is applied to a mould based on simulations. During the rotational moulding process, the state of the simulation variable in the rotational moulding process is monitored at certain time spans, and may be collected every 0.1 second, every 1 second, every 10 seconds or every 1 minute during a specific rotational moulding process. Based on said state, an action from a set of predefined actions is provided to update the rotational moulding program. Subsequently, the simulation variable may move to a new state, and an action is then provided. For example, during a rotational moulding process, temperature is detected to be too high, subsequently, the simulation module simulates a new mould temperature-time profile to be applied to the mould on the basis of the current temperature.

The goal of reinforcement learning is to perform a rotational moulding process optimally or near optimally. In reinforcement learning, the simulation system may be configured to decide to 'exploit' or 'explore' based on an exploration-exploitation trade-off. It will be understood by the skilled person that optimal learning requires sometimes making some bad choices to learn from mistakes. The rationale is that these near optimal actions are necessary for long term benefit. It will be understood by the skilled person that the exploration-exploitation dilemma is a trade-off between improving current state vs. learning more now and improving future state. For example, during a rotational moulding process, temperature is detected to be too high, subsequently, the simulation module decides whether to 'exploit' and simulate a temperature-time program to be applied to the mould that will certainly lower the temperature, or to simulate a 'new' pressure-time program to be applied in the mould and 'explore' the resulting effects on the temperature.

In embodiments, the simulation system may comprise a raw materials database containing data sheets of a plurality of raw materials, each of said data sheets comprises for each raw material at least one rotational moulding thermal characteristic. Each datasheet may comprise or contain flow characteristics 41c of the respective raw material. The simulation system may connect to a server whereon the raw materials database may be stored to obtain the at least one rotational moulding thermal characteristic for each material. The simulation system may connect to a server to obtain the at least one rotational moulding pressure characteristic for each material. The simulation system may connect to a server to obtain the at least one rotational moulding thermal characteristic and the at least one rotational moulding pressure characteristic for each material.

Each rotational moulding thermal characteristic may be segmented and segment may be determined based on at least one raw material thermal behaviour during the rotational moulding of an object, and each segment may be approximated by a mathematical function as described herein before.

In embodiments, the suitable motion-time program 43 may be determined on the basis of the flow characteristics 41c of a raw material. The flow characteristics 41c of a raw material may also be a basis for defining the virtual mould and the virtual heating and cooling system, preferably the virtual heating and cooling system is at least partly integrated in the mould wall.

In the embodiment shown in FIG. 8, the simulation system 2 may comprise a user interface 9, configured for enabling a user to define an object, a virtual mould 3, a virtual mould heating and cooling system 4, a temperature-time program 42, a virtual motion system 5, a motion-time program 43, a virtual pressure system 6, a pressure-time program 44, a humidity-time program 45, a virtual feeding system 7 and/or a dosing-time program 46, preferably an object to be moulded by means of a rotational moulding process.

In an embodiment, the simulation of the at least one simulation variable 8 may be decided by the simulation system 2 or by the user using the user interface 9.

In embodiments, the user interface 9 may be configured for enabling the user to update the predetermined rotational moulding thermal characteristic during the rotational moulding of an object or during the simulation of a rotational moulding of the object by means of the virtual rotational moulding system. For example, during a rotational moulding process, the user decides to reduce the desired PIAT, subsequently, the simulation module 8 simulates a new suitable temperature-time program to be applied to the mould during the rotational moulding process, while taking into account the current desired PIAT. Thus, the temperature-time program being used in the rotational moulding process is then updated with the new suitable temperature-time program.

In embodiments, the simulation results of the rotational moulding process are then used to perform rotational moulding using a rotational moulding system 1 as described herein.

In embodiments, the rotational moulding simulation system 2 may be a virtual representation of the rotational moulding system 1 as described herein. The simulation system may for example be used for testing changes to the rotational moulding system 1 in the virtual environment before physical implementation.

In embodiments, the rotational moulding simulation system 2 may be used to determine, based on (at least) a rotational moulding thermal characteristic of a raw material, at least one suitable temperature-time program 42 and/or at least one suitable motion time-program 43, and/or other programs such as pressure-time, humidity-time, dosage-time etc., for the rotational moulding of an object by means of the rotational moulding system 1. In particular, the determination by means of the simulation system may involve the same procedure as has been described with reference to FIGS. 7a-7c, optionally completed by at least one simulation of the rotational moulding process using the selected temperature-time program 42, motion time-program 43, and/or other programs such as pressure-time, humidity-time, dosage-time etc., at least for the purposes of verification, preferably for the purposes of further optimization.

The invention claimed is:

1. A rotational moulding system, comprising
a mould having a mould wall surrounding a mould cavity,
at least one sensor arranged within the mould cavity for measuring an internal air temperature of the mould cavity,
a mould heating and cooling system at least partly integrated with the mould wall and provided for applying a temperature-time program to the mould,
a motion system to which the mould is connectable and provided for applying a motion-time program to the mould, and
a control system for controlling the mould heating and cooling system and the motion system, wherein the control system is configured for determining at least one suitable mould surface temperature-time program and at least one suitable motion-time program for the rotational moulding of an object by means of the rotational moulding system on the basis of a predetermined rotational moulding thermal characteristic of a raw material to be used for the rotational moulding of the object, wherein the predetermined rotational moulding thermal characteristic is a target mould cavity temperature-time profile for the at least one raw material,
wherein the at least one mould surface temperature-time program is a temperature over time to which the mould surface needs to be heated or cooled to such that the internal air temperature of the mould cavity approaches the target mould cavity temperature-time profile, and
wherein the control system is provided for adjusting the at least one mould surface temperature-time program and the at least one motion-time program on the basis of the internal air temperature measured by the at least one sensor.

2. The rotational moulding system according to claim 1, wherein the rotational moulding system comprises at least one sensor for collecting feedback of at least one process parameter during the rotational moulding of the object.

3. The rotational moulding system according to claim 2, wherein the control system is configured for evaluating the collected feedback and adjusting at least one of the temperature-time program and the motion-time program that is being applied.

4. The rotational moulding system according to claim 2, wherein the control system is configured for evaluating the collected feedback and determining a further temperature-time program and/or a further motion-time program to be applied for the rotational moulding of subsequent pieces of said object.

5. The rotational moulding system according to claim 2, wherein the control system is configured for transmitting the collected feedback to a remote server.

6. The rotational moulding system according to claim 1, wherein the control system comprises a raw materials database containing data sheets of a plurality of raw materials, each of said data sheets comprising for each raw material at least one rotational moulding thermal characteristic.

7. The rotational moulding system according to claim 6, wherein each rotational moulding thermal characteristic is segmented and each segment is approximated by a mathematical function.

8. The rotational moulding system according to claim 7, wherein at least one segment is approximated by a second order, third order, or higher order mathematical function.

9. The rotational moulding system according to claim 7, wherein each segment is determined based on at least one raw material thermal property.

10. The rotational moulding system according to claim 7, wherein transitions between the segments are determined based on at least one raw material thermal property.

11. The rotational moulding system according to claim 6, wherein each data sheet contains flow characteristics of the respective raw material and wherein the control system is provided for considering the flow characteristics in determining the suitable motion-time program.

12. A method for rotationally moulding an object by means of a rotational moulding system, wherein the rotational moulding system comprises
- a mould having a mould wall surrounding a mould cavity,
- at least one sensor arranged within the mould cavity for measuring an internal air temperature of the mould cavity,
- a mould heating and cooling system at least partly integrated with the mould wall and provided for applying a temperature-time program to the mould,
- a motion system to which the mould is connectable and provided for applying a motion-time program to the mould, and
a control system for controlling the mould heating and cooling system and the motion system; and
wherein the method comprises the step of the control system determining at least one suitable mould surface temperature-time program and at least one suitable motion-time program for the rotational moulding of an object by means of the rotational moulding system on the basis of a predetermined rotational moulding thermal characteristic of a raw material to be used for the rotational moulding of the object, wherein the predetermined rotational moulding thermal characteristic is a target mould cavity temperature-time profile for the at least one raw material,
wherein the at least one mould surface temperature-time program is a temperature over time to which the mould surface needs to be heated or cooled to such that the internal air temperature of the mould cavity approaches the target mould cavity temperature-time profile, and
wherein the control system is provided for adjusting the at least one mould surface temperature-time program and the at least one motion-time program on the basis of the internal air temperature measured by the at least one sensor.

13. The method according to claim 12, further comprising the step of simulating the rotational moulding process by means of a rotational moulding simulation system, using said at least one suitable temperature-time program and at least one suitable motion-time program.

* * * * *